US012033184B2

(12) United States Patent
Guimaraes et al.

(10) Patent No.: US 12,033,184 B2
(45) Date of Patent: Jul. 9, 2024

(54) DIGITAL CHANNEL PERSONALIZATION BASED ON ARTIFICIAL INTELLIGENCE (AI) AND MACHINE LEARNING (ML)

(71) Applicant: Sitecore Corporation A/S, Copenhagen (DK)

(72) Inventors: Marc Perreau Guimaraes, Los Gatos, CA (US); Tetiana Kostenko, Frederiksberg C (DK); Samira Sadeghi, San Francisco, CA (US); Mingde Xu, San Jose, CA (US); Abhishek Soni, Hayward, CA (US); Romeo B. Valencia, San Francisco, CA (US); Nancy Huei-Jiun Lee, San Jose, CA (US)

(73) Assignee: SITECORE CORPORATION A/S, Copenhagen (DK)

( * ) Notice: Subject to any disclaimer, the term of this patent is extended or adjusted under 35 U.S.C. 154(b) by 19 days.

(21) Appl. No.: 17/085,680

(22) Filed: Oct. 30, 2020

(65) Prior Publication Data

US 2022/0138798 A1 May 5, 2022

(51) Int. Cl.
*G06Q 30/02* (2023.01)
*G06F 16/90* (2019.01)
(Continued)

(52) U.S. Cl.
CPC ....... *G06Q 30/0254* (2013.01); *G06F 16/906* (2019.01); *G06N 20/00* (2019.01)

(58) Field of Classification Search
CPC .............. G06Q 10/04; G06Q 30/0633; H04N 21/6125; H04N 21/4753; H04L 67/567; H04L 63/102
See application file for complete search history.

(56) References Cited

U.S. PATENT DOCUMENTS 6,981,040 B1 * 12/2005 Konig ................. H04L 67/55
7,013,290 B2 * 3/2006 Ananian ............. H04L 63/102
705/26.42

(Continued)

OTHER PUBLICATIONS

Lee, D. D., et al., "Algorithms for Non-negative Matrix Factorization", Advances in Neural Information Processing Systems, 2001, pp. 1-7, vol. 13.

(Continued)

*Primary Examiner* — Saba Dagnew
(74) *Attorney, Agent, or Firm* — Gates & Cooper LLP

(57) ABSTRACT

A method, system, and apparatus provide the ability to personalize a digital channel. A digital channel is provided to multiple users and visitor information at each visit is collected. The visitor information includes data about each visit and multiple content items that are presented. The users are autonomously clustered by segmenting the user population into behavioral groups such that mutual information is maximized between the users in an assigned behavioral group and the content items. Based on the clustering, a model is generated that estimates a score for each interaction between users and content items. The model is updated at a defined interval. Based on the score, content items to recommend to a specific user are determined. The recommendation jointly maximizes an outcome and a learning speed of the model. The personalized digital channel is delivered to the specific user based on the recommended multiple content items.

24 Claims, 17 Drawing Sheets

(51) Int. Cl.
*G06F 16/906* (2019.01)
*G06N 20/00* (2019.01)
*G06Q 30/0251* (2023.01)

(56) References Cited

U.S. PATENT DOCUMENTS

| | | | | |
|---|---|---|---|---|
| 2002/0174428 | A1* | 11/2002 | Agnihotri | H04N 21/44218 |
| | | | | 725/9 |
| 2005/0204276 | A1* | 9/2005 | Hosea | G06Q 30/02 |
| | | | | 715/205 |
| 2006/0190616 | A1* | 8/2006 | Mayerhofer | H04L 67/567 |
| | | | | 709/231 |
| 2008/0306895 | A1* | 12/2008 | Karty | G06Q 10/04 |
| | | | | 703/2 |
| 2009/0007172 | A1* | 1/2009 | Ahanger | G11B 27/034 |
| | | | | 725/36 |
| 2011/0029382 | A1* | 2/2011 | Narasimhan | G06Q 30/02 |
| | | | | 705/14.52 |
| 2012/0042262 | A1* | 2/2012 | Priyadarshan | G06Q 30/0269 |
| | | | | 715/745 |
| 2014/0108316 | A1* | 4/2014 | Goldman | G06Q 30/0241 |
| | | | | 706/46 |
| 2016/0247175 | A1* | 8/2016 | Milton | H04W 4/029 |
| 2017/0109330 | A1* | 4/2017 | Alon | G06Q 30/0201 |
| 2017/0171580 | A1* | 6/2017 | Hirsch | H04L 67/62 |
| 2018/0089742 | A1* | 3/2018 | Narasimhan | G06Q 30/0633 |
| 2019/0141399 | A1* | 5/2019 | Auxer | H04N 21/4753 |

OTHER PUBLICATIONS

Blei, D.M., et al., "Latent Dirichlet Allocation", Journal of Machine Learning Research, 2003, pp. 993-1022, vol. 3.

Zou, H., et al., "Regularization and variable selection via the elastic net", J. R. Statist. Soc. B, 2005, pp. 301-320, vol. 67, Part 2.

Friedman, J.H., "Greedy Function Approximation: A Gradient Boosting Machine", The Annals of Statistics, 2001, pp. 1189-1232, vol. 29, No. 5.

Lecun, Y., et al., "Deep Learning", Nature, May 2015, pp. 436-444.

Vanchinathan, H.P., et al., "Explore-Exploit in Top-N Recommender Systems via Gaussian Processes", Conference Paper, Oct. 2014, pp. 1-8.

Pang, B., et al., "Opinion Mining and Sentiment Analysis", Foundations and Trends® in Information Retrieval, 2008, pp. 1-135, vol. 2, Nos. 1-2.

* cited by examiner

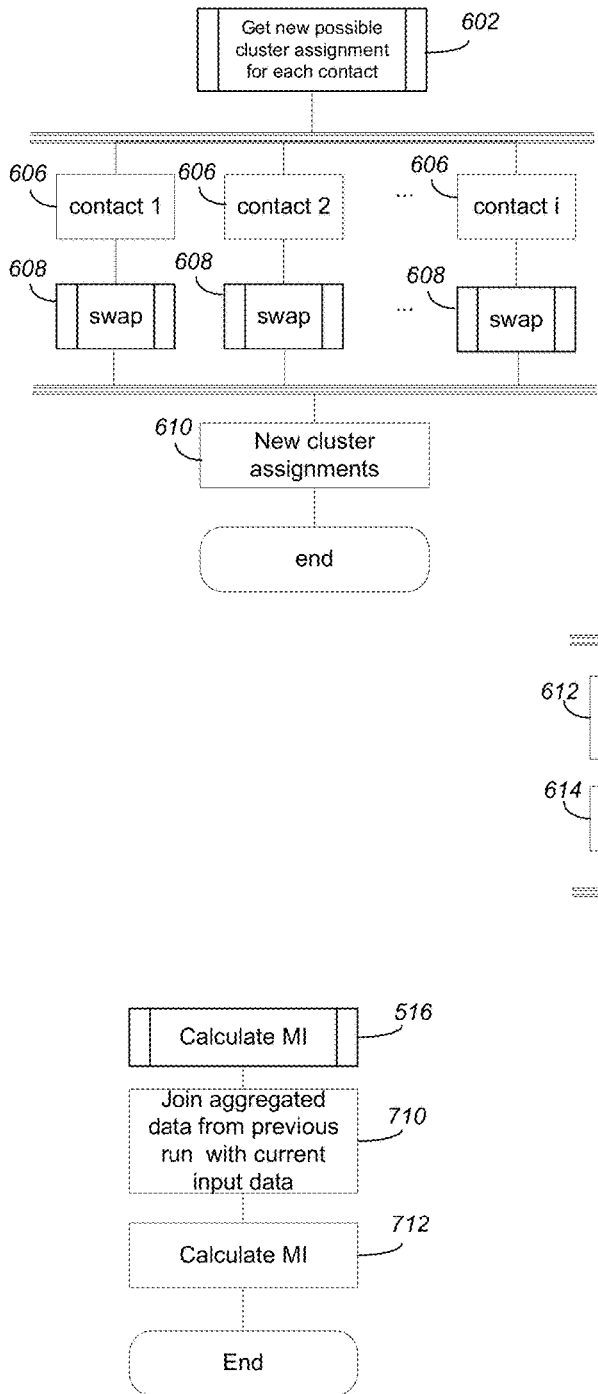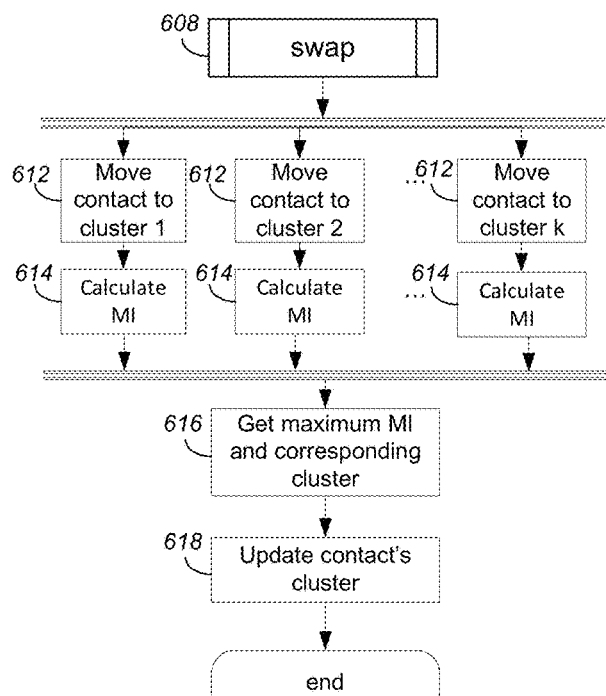
FIG. 7B
Multi Thread Incremental Hard MI
FIG. 7C
FIG. 7D

Multi Thread Incremental Soft MI

DIGITAL CHANNEL PERSONALIZATION BASED ON ARTIFICIAL INTELLIGENCE (AI) AND MACHINE LEARNING (ML)

BACKGROUND OF THE INVENTION

1. Field of the Invention

The present invention relates generally to digital channels, and in particular, to a method, system, apparatus, and article of manufacture for automatic/autonomous personalization of a digital channel.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of the publications listed in the References section is incorporated by reference herein.)

Companies use digital channels to promote their brand, sell their products, and retain or add new customers. Examples of such digital channels are websites, phone or tablet apps, email, and social media. Creating and managing the necessary content and assembling it in a personalized experience tailored to each customer is mostly a manual process requiring large digital marketing teams leading to high costs, slow innovation and little personalization.

Accordingly, what is needed is a system that autonomously/automatically personalizes a digital channel without a primarily manual process.

SUMMARY OF THE INVENTION

Embodiments of the invention propose a novel system based on artificial intelligence (AI) to automate the delivery of personalized digital experiences based on data collected on past visits, content attributes and other contextual information available at the time of the visit and provide businesses with data driven insights into the behavior of customers and performance of the digital channel. More specifically, embodiments of the invention collect visitor information about each visit, autonomously cluster users by segmenting the users into behavioral groups such that mutual information between the users in a group and content items (of the digital channel) are maximized, generate a model of interaction between the users/visitors and content items, recommend multiple content items for a specific user (where the recommended item jointly maximizes an outcome and a learning speed of the model), and personalize and deliver the digital channel to the specific user based on the recommended multiple content items.

BRIEF DESCRIPTION OF THE DRAWINGS

Referring now to the drawings in which like reference numbers represent corresponding parts throughout:

FIGS. 7A-7D illustrate the multi thread incremental hard mutual information clustering process based on maximizing mutual information in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Structural Overview

Figure 1:
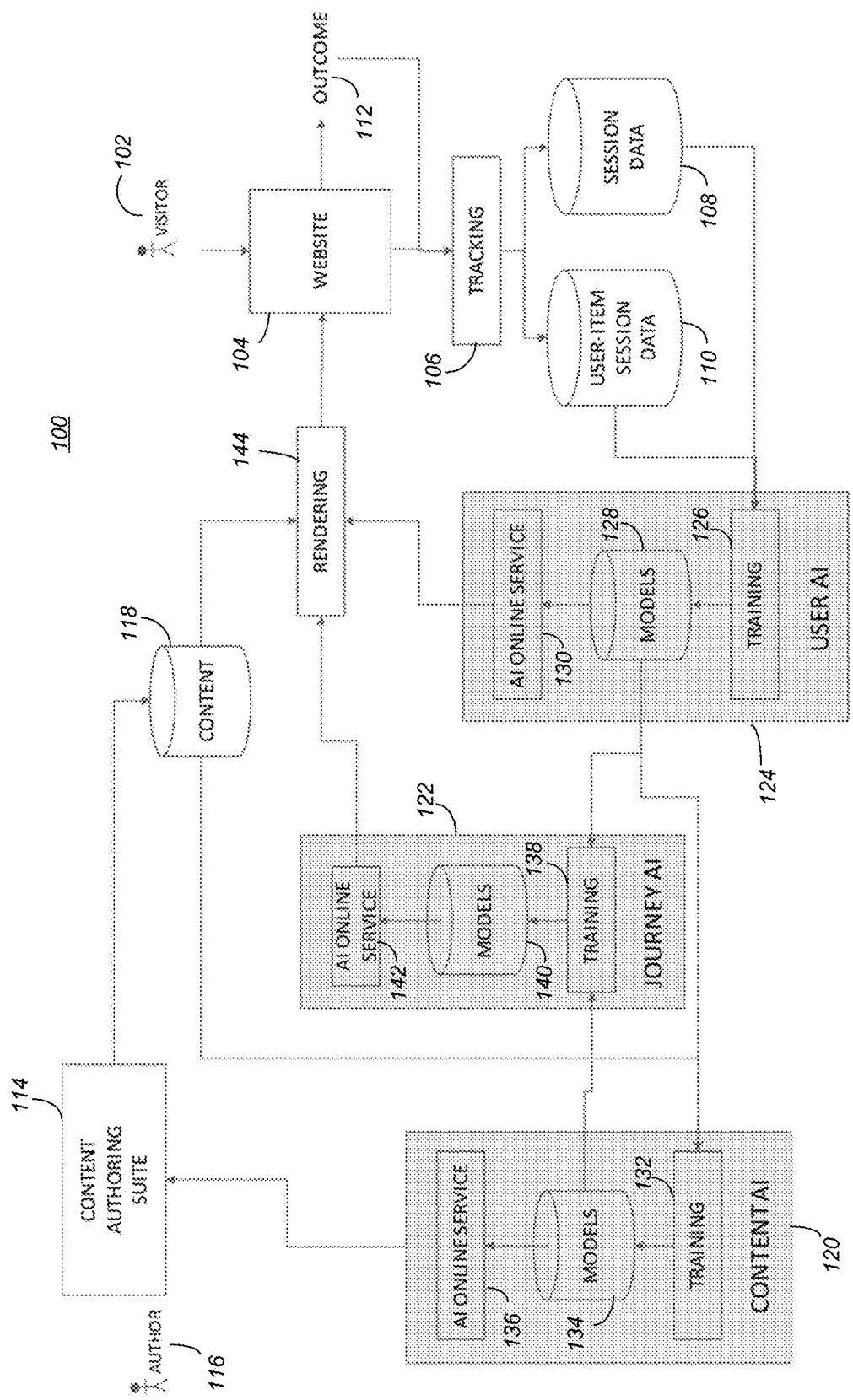
FIG. 1 illustrates the structural overview of a digital channel personalization system in accordance with one or more embodiments of the invention.

FIG. 1 illustrates the structural overview of a digital channel personalization system 100 in accordance with one or more embodiments of the invention. When a visitor 102 visits a customer website 104, embodiments of the invention collect data all along the session (i.e., via tracking 106). There are three kinds of data collected. Session data 108 is made of contextual data such as time, region, browser and device. User-item (session) data 110 corresponds to events associating the visitor to the content: visitor x was shown content y in placeholder z. Outcome data 112 records events related to the business value of the session such as goals, monetary value. At the other side of the application, an authoring suite 114 provides tools for digital marketing teams/authors 116 to create new content 118.

There are three (3) principal modules 120-124 that may be used to develop/determine content 118.

The user AI 124 gets batches of user-item data 110 and session data 108 to train 126 models 128 that by segmenting users aim at recommending content 118 for placeholders in the digital channel/website such as maximizing the expected business value of the session (outcome). Trained models 128 are then used to recommend content 118 in real time through the user AI online service 130.

The content AI 120 breaks down content 118 (text, images, videos) into attributes (keywords, topics, sentiment, color, landscape, faces) and trains 132 models 134 to estimate the performance of content and content attributes in the user segments. The trained models 134 are then used to recommend content 118 through the user AI online service 136.

The journey AI 122 uses information provided by the user AI 124 and the content AI 120 to recommend the sequence of events (pages, triggered events such as chat box) maximizing the expected outcome. In this regard, the journey AI 122 may also train 138 models 140 which are then used to recommend content 118 in real time through the user AI online service 142.

The training modules 126, 132 and 138 may be the same training modules or may be different for each module 120-124. Similarly, the models 128, 134, and 140, and the AI online services 130, 136, and 142 may also be the same or may be different for each module 120-124. The results from the AI online service(s) 130, 136, and 142 may be provided to a rendering module 144 to render/generate the website/digital channel 104.

In view of the above, the system 100 collects detailed information about end users 102 visiting a website 104 or similar digital experience media. This data is used to train machine learning (AI) models 128, 134, and 140 in order to predict what variation of content has the most likelihood to get an end user 102 to convert to the business objective of the website 104. A website 104, or digital experience, is composed of pages that are themselves composed of components (or blades). In most use cases, a personalized experience where components can render a variety of content optimized for each individual end user 102 leads to better outcomes than a static experience. Traditionally this is done by manually defining segments of a population based on a few contextual parameters such as region, age group, device, etc., and setting up logical rules to determine what content 118 to render 144 for a specific end user 102.

Recently, systems based on contextual machine learning such as reinforced contextual bandits have been proposed to automate the personalization of digital experiences. This relies on a few contextual parameters and does not leverage detailed behavioral data that are collected. Embodiments of the invention leverage clustering methods/algorithms to determine groups of end users 102 based on trends of behavior as well as contextual information, each end user 102 is then defined by a unique numerical representation that maps it to its past behavior and the best estimation of its future behavior. The system 100 regresses the outcome of interest, a business measure of success, to the numerical representation of end users. The parameters of those models 128, 134, and 140 are trained on a regular basis using available data collected on past visits to the website. The system 100 may also provide recommendations for new end users 102 for whom there is no or little past data and new content for which there is no past rendering.

Accordingly, the system 100 may provide one or more of the following features:

Collects detailed behavioral information at each visit of the digital experience.
Automatically segments end users in groups of similar behavior.
Automatically determines the content to render for each end user in order to maximize the business outcome.
Optimizes personalization for new end users.
Optimizes personalization for new content.
Provides analytic insights into visitor segments (or principal behaviors) allowing businesses to better understand their market.
Provides analytical insights into how content attributes perform with visitor segments.

User AI Module 124 Details

The system 100 uses past visits data collected and stored in a database to model visitor behavior though three main variables: Content (C), Visitor (V) and Outcomes (O).

Content (C) is a unique identifier of a piece of content that can be text, image, video, layout or a superset of those.

A Visitor (V) represents the system's knowledge about visitors, practically all the data collected about visitors' past visits including what content was presented, how it was assembled, the visitor actions, outcomes of the visits and profile information such as regions, devices, browsers.

Outcomes (O) are actions by the visitor that trigger a gain to the business, such as buying a product.

The system 100 models 128 the interactions between the visitor 102 and the digital channel/website 104 and uses a method/algorithm to assign a probability (or score) P(C,V,O) to each different possible case.

The aim of the system is to maximize the expected outcome for a given visitor. So, the utility function is $$U(V,C)=P(O|V,C)$$

Where $$P(O \mid V, C) = \frac{P(O, V, C)}{P(V, C)}$$

is the probability to observe outcome O given a visitor V and a content item C.

The algorithm maximizes the utility function varying the content C for each visitor. The best experience is then provided by C→argmax(U(V,C)).

Figure 2:
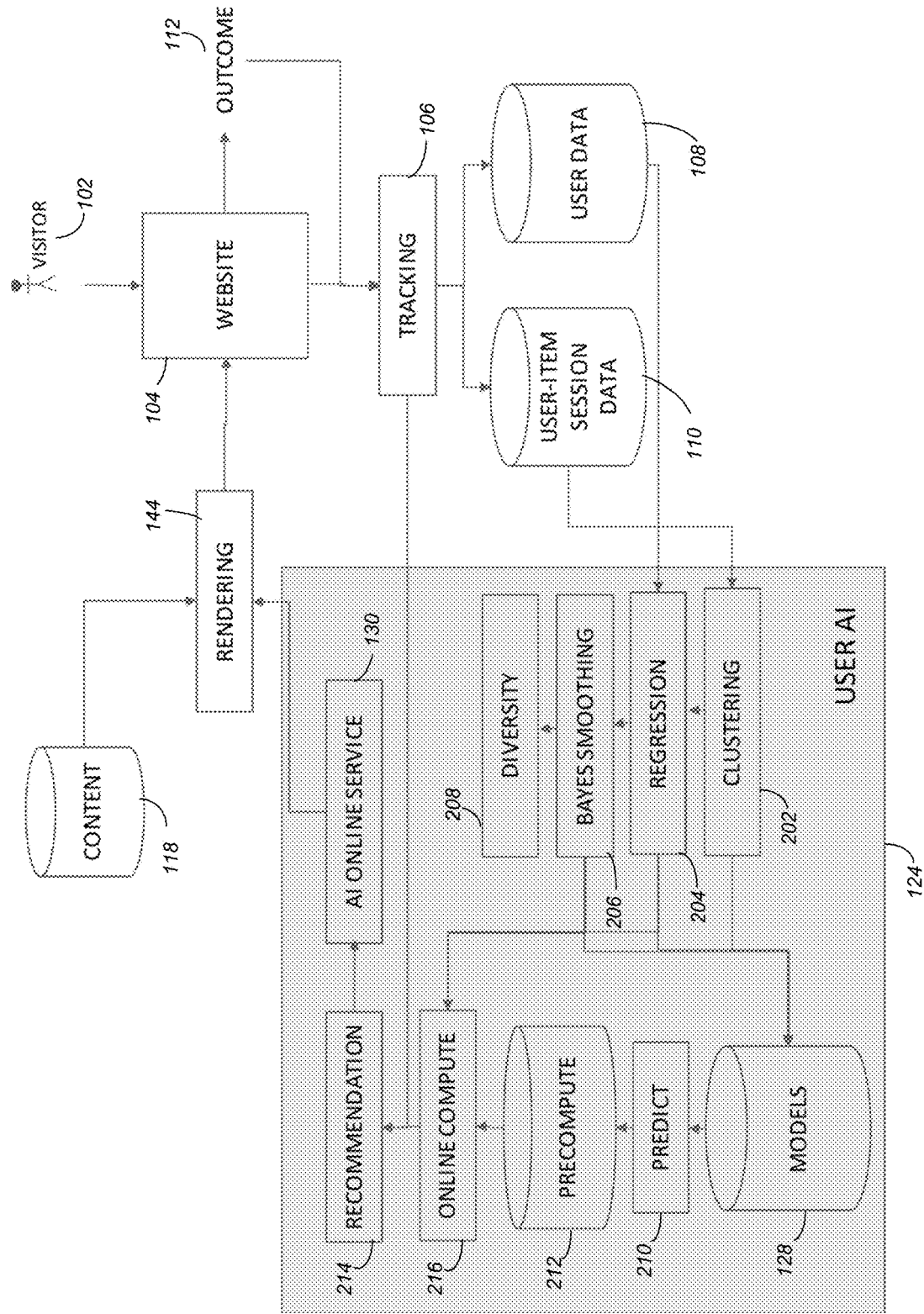
FIG. 2 illustrates the structural details of a user AI module in accordance with one or more embodiments of the invention.

FIG. 2 illustrates the structural details of the user AI module 124 in accordance with one or more embodiments of the invention. The user AI 124 is composed of several modules:

The clustering module 202 uses user-item data 110 to segment the user population into principal behavioral groups.
The regression module 204 predicts outcomes as a function of the visitor's cluster representation (i.e., segments) and contextual data/user-session data 110 such as region, device and browser.
The Bayes smoothing module 206 uses a prior (i.e., a prior probability distribution) to smoothly transition from an averaged estimation of outcome per item to a personalized estimation (with a diversity of results 208) as the system gains knowledge about a visitor 102. The prior is forgotten after a few visits. The training is performed daily (to provide predictions 210) and precomputed models 212 are stored in a versioned database. When a visitor 102 reaches the website 104, the online service 130 requests a recommendation 214 from the online compute module 216. Stated in other words, the recommendation module 214 uses Bayesian inference 206 and an explore-exploit mechanism to determine the item to recommend to a specific visitor 102 in order to jointly maximize the outcome and the learning speed of the system.

Clustering Module 202

Clustering techniques are used to segment users into a small set of principal behaviors (called clusters, groups or topics). Novel clustering methods leveraging information theory principles are described below. The result of the clustering module is an estimated score for each visitor and each item called, $\hat{A}_{ij}$.

Maximizing Mutual Information

Mutual information maximization has been used in the past for recommending items to users and a greedy algorithm for hard clustering maximizing mutual information has been proposed. Embodiments of the invention provide a novel soft clustering maximizing mutual information and two novel enhancements for distributing the algorithm and for an incremental version of the algorithm.

Matrix Factorization (ALS)

Figure 3:
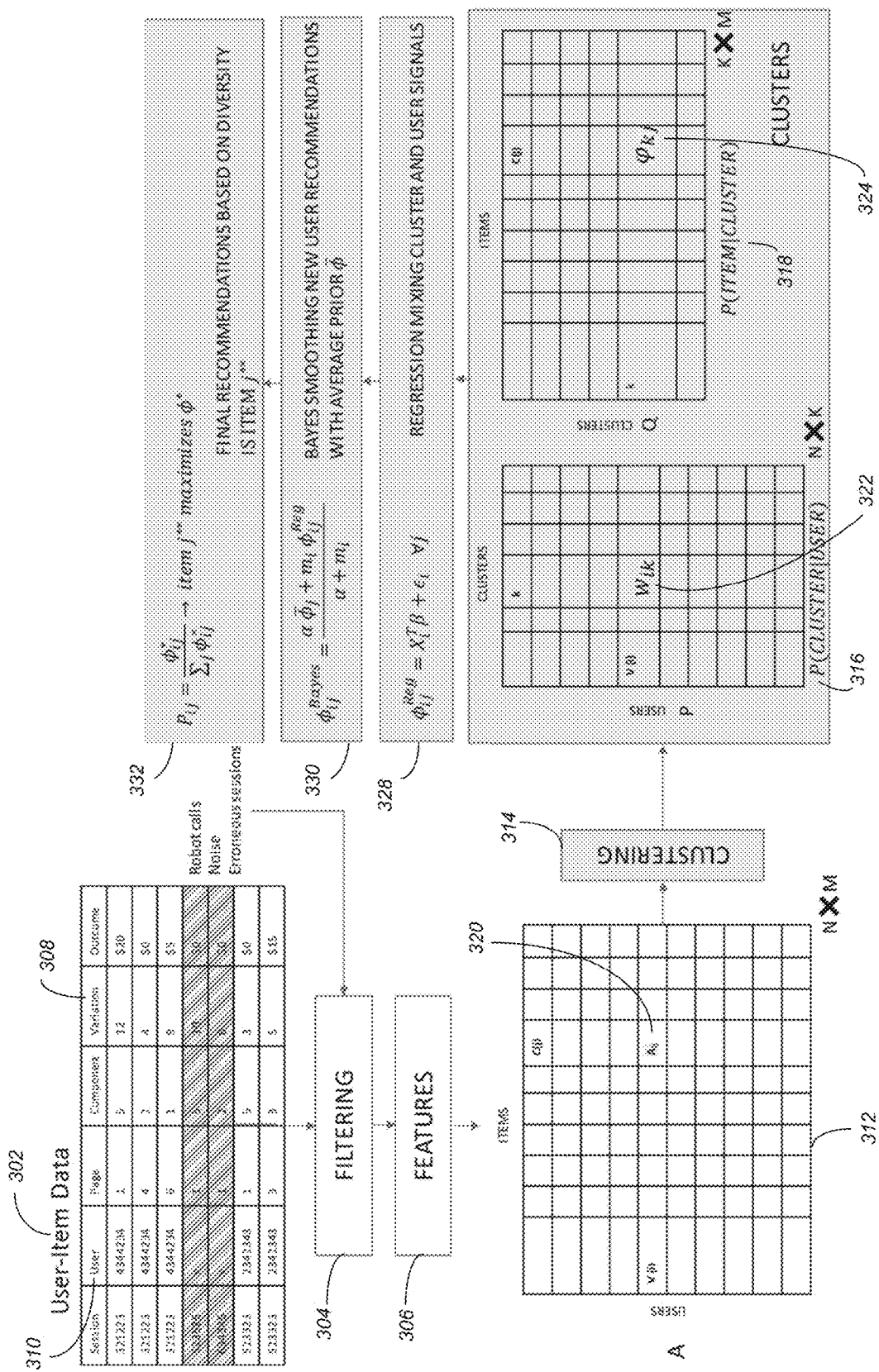
FIG. 3 illustrates the idea behind matrix factorization in accordance with one or more embodiments of the invention.

Matrix Factorization, is one of the most popular methods for collaborative filtering. Collaborative filtering is a technique that utilizes user behaviors. A Matrix Factorization model quantizes users and items by a latent factor vector. FIG. 3 illustrates the idea behind matrix factorization.

Generally, the user-item data 302 is processed in order to filter out 304 irrelevant and noisy sessions such as robot calls. The features 306 are built by aggregating the total value of a variation (items) 308 for each user 310. The user-item matrix 312 is then used to cluster 314 users 310 into a small set of principal behaviors (sometime called topics). This clustering 314 provides for each user 310, a matrix 316 indicating how representative each topic is P(CLUSTER|USER) and a matrix 318 giving for each cluster, the performance of each item P(ITEM|CLUSTER), which in this case is used to estimate the outcome for each item in a cluster P(OUTCOME|CLUSTER,ITEM).

More specifically, we start with user-item matrix $A(V,C)_{N \times M}$ 312 which sets for each past visitor (V) and each content (C), a value monotonic to the aggregated outcomes of all visits of this visitor V where the content C was shown. The matrix A 320 is then decomposed/clustered 314 into two matrices $P_{N \times K}$ 316 and $Q_{K \times M}$ 318 that may include minimizing the error $\|A-\hat{A}\|$ where $\hat{A}=PQ$.

The matrix P 316 holds a decomposition of each visitors into a set of K principal behaviors (latent factor vector) described by the matrix Q 318.

Where $w_{ik}$ 322 measures how representative cluster k is for visitor i←P(CLUSTER|USER).

$\varphi_{kj}$ 324 is a measure of success of content j on cluster k, ←P(ITEM|CLUSTER).

Here, $\varphi_{kj}$ 324 is used to estimate the outcome for each item in a cluster←P(OUTCOME|CLUSTER,ITEM).

$$\varphi_{kj} = \frac{\sum_i w_{ik} \phi_{ij}}{\sum_i w_{ik}} \quad (1)$$

$\phi$ is measure of business gain based on customer. Score for each visitor and each item will be calculated as:

$$\hat{A}_{ij} = \frac{\sum_k w_{ik} \varphi_{kj}}{\sum_k w_{ik}} \quad (2)$$

Latent Dirichlet Allocation (LDA)

LDA is one of the most popular methods for topic modelling. It is a generative probabilistic model that allows sets of observed data to be explained by latent factors. It provides an explanation on why some parts of the data are similar. LDA uses Dirichlet distributions as priors to model document-topic and word-topic.

Here, embodiments of the invention define P(C,V,O) as a mixture of multinomial models with priors for the mixture distribution as well as for the individual multinomial distributions.

In the context of LDA, each visitor with all its' historical interactions forms a document. LDA will be applied on all visitors and outcome will be a weight vector for each visitor which shows how representative cluster k is for visitor i, namely it provides $w_{ik}$. $\hat{A}_{ij}$ will be calculated the same as ALS.

Regression Module 204

Multiple regression is a statistical method that uses explanatory variables to predict the outcome of a response variable. Returning to FIG. 3, after clustering 314, regression mixing 328 is performed on the cluster and user signals 316. Here, explanatory variables are the cluster representation of the visitor and contextual data such as region, device and browser and the response variable is the business gain, O.

For all visitors i and all items j, note $X_{ij}$ as the set of variables including the cluster score $\hat{A}_{ij}$ computed by the clustering module 202 and the contextual variables.

For binary outcomes such as clickthrough the system uses a logistic regression model $$\log\left(\frac{P(O|X)}{1-P(O|X)}\right) = X\beta \quad (3)$$

where β is the set of model coefficients.

For numerical outcomes such as a dollar amount, the systems uses a linear regression model O=Xβ

The coefficients of the model are trained using past data. As for the clustering, the training is scheduled but does not need to be at the same frequency. We call the predicted output regression module $\phi^{Reg}$.

Recommendation Module 214

When the available data for a visitor or for an item is small, the prediction from the regression module becomes unreliable. This can happen when there is not enough collected data or when a visitor has not been seen previously or when a new content item is added to the digital experience. If the system always recommends the same item to a visitor based on little data, not only is the recommendation unreliable, but the system also loses the ability to learn that visitor behavior when presented with alternative items. The goal of the recommendation module 214 is to jointly maximize the quality of the prediction and the learning power of the system. Reinforced learning methods have been proposed for similar problems in different applications. Here, we describe a cost-effective method based on those ideas but novel in its application. Thus, as illustrated in FIG. 2 and FIG. 3, the regression mixing 328 (within regression module 204) is used to take into account user-session data 110 and the Bayes smoothing module 206 is used to smooth estimations for the users the system has no or little past knowledge of. Accordingly, the Bayes smoothing module 206 is used to perform Bayes smoothing 330 for the new user recommendations with average prior $\bar{\phi}$. Thereafter, the recommendation module 214 is used to generate the final recommendations at 332 (e.g., based on diversity). Details regarding these steps are described below.

For each item a prior score $\phi_j^0$ is estimated as the score averaged across all visitors. The conjugate prior distribution depends on the type of outcome, binomial-beta for binary outcomes, gaussian-gaussian for numerical outcomes. But the form of the mean posterior is essentially the same.

The main goal is to get the prior forgotten smoothly as knowledge about a visitor is gained.

$$\phi_{ij}^{Bayes} = \frac{\alpha \phi_j^0 + m_i \phi_{ij}^{Reg}}{\alpha + m_i} \; \forall j \quad (4)$$

where $\alpha$ represents how fast we forget the prior $m_i$ is the number of visits for visitor i. $\phi_1^0$ is the prior based on average business gain of all users for the particular item j and is the same across all users.

$$\phi_j^0 = \frac{1}{N_i} \sum_i \phi_{ij} \quad (5)$$

Where $N_i$ is the total number of visitors. For a numerical score, if we assume our $\phi_{ij}^{Reg}$ have a normal distribution with unknown mean $\mu_i$k and known precision $\tau_i$ ($\phi_{ij}^{Reg} \sim N(\mu_i, \sigma_i^2)$) and assuming $\mu_i$ having a normal distribution as a prior $\mu_i \sim N(\mu_0, \sigma_0^2)$ with known $\mu_0$, $\tau_0$. Then $\mu_i | \phi_{ij}^{Reg} \sim N(\mu'_i, \sigma'^2_i)$, with $$\mu'_i = \frac{\tau_0 \mu_0 + \tau_i \phi_{ij}^{Reg}}{\tau_0 + \tau_i} \quad (6)$$

Comparing equation (6) with (4) we see that $\alpha = \tau_0, \overline{\phi}_j = \mu_0, m_i = \tau_i$ The last step is to draw a recommendation (i.e., step 332) from the posterior distribution.

General Advantages and Logical Flow

As described above, embodiments of the invention provide the ability to autonomously/automatically personalize digital channels. While prior art systems may provide some personalization via a recommender system, such recommenders' main purpose is to fit (in a screen) a personalized subset of stored items from a very large list that would be too much both for displaying gracefully in a page and overwhelming for the customer. Embodiments of the invention satisfy a core objective for personalizing many elements of a digital experience. Those elements can be a list of products, an image, a text or a layout, the flow, the website itself, etc. all in the same digital experience. In addition, prior art pure product recommenders utilize a metric to optimize that is always directly available for each visit, such as the cumulative value of goods purchased. In contrast, embodiments of the invention may be utilized in a B2B business where customers have very different use cases and a variety of metrics to measure the success of a visit, some of those metrics being indirect such as an action a visitor performs with a delay after the end of a visit, such as traveling to a country a few weeks after visiting a tourism website.

Figure 4:
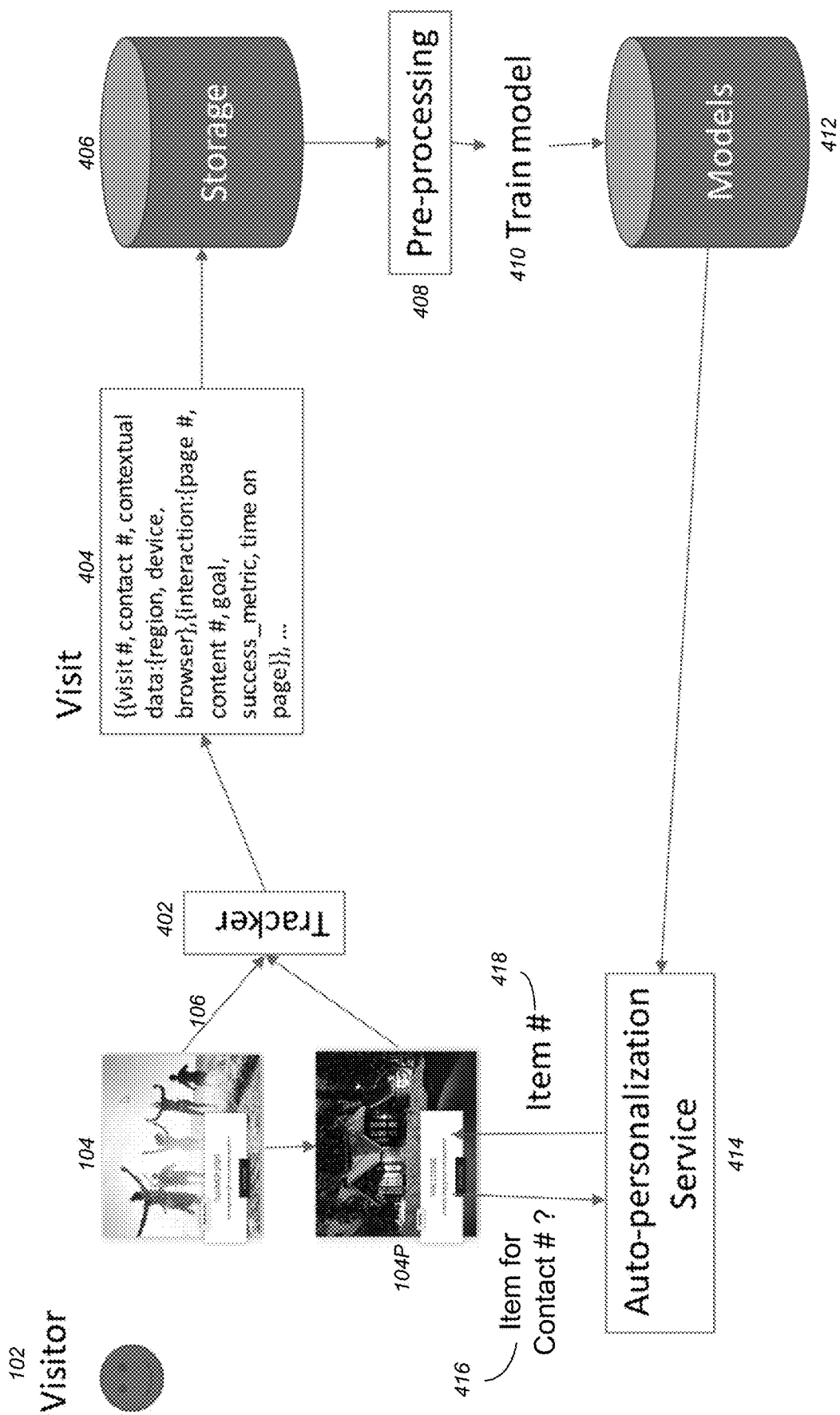
FIG. 4 illustrates the logical flow for autonomously personalizing a digital channel in accordance with one or more embodiments of the invention.

To better understand such advantages, an additional description of the overall logical flow followed by some more detailed logical flows may be useful. FIG. 4 illustrates the logical flow for autonomously personalizing a digital channel in accordance with one or more embodiments of the invention. The components and steps illustrated in FIG. 4 are similar to that of FIGS. 1 and 2. When a visitor 102 visits a customer website 104, all data during the session is tracked using tracker 402 (i.e., resulting in Visit data 404). For each visit (identified by a visit #, contact # and contact #), there are three kinds of data collected. Session data is made of contextual data such as time, region, browser and device. User-item data (also known as interaction data) corresponds to events associating the visitor to the content: the page # and the content #. Outcome data records events related to the business value of the session such as goals, a success metric, the time on the page, monetary value, etc.

The Visit data 404 is stored in storage/database 406. After pre-processing 408 the visit data 404, the pre-processed visit data 404 is used at step 410 to train the model resulting in trained models 412. As noted above, the pre-processing 408 and creation of models 412 is enabled via a series of modules that perform clustering, regression, and Bayes smoothing.

Trained models 412 are then used to recommend content in real time through an auto-personalization service 414 (referred to in FIGS. 1 and 2 as an AI online service 130). The auto-personalization service 414 operates autonomously and automatically without any additional user input. In this regard, the auto-personalization service 414 receives an item for a contact # request 416 (i.e., from a website to be personalized—i.e., website 104P), and in response, the service 414 provides/recommends an item #418. The process is then repeated (e.g., via ML/AI to improve the personalization).

In view of the above, embodiments of the invention have the ability to provide the right content for the right person at the right time. In this regard, information about users is learned, and a determination is made regarding the correct content to show them based on the system's own analysis and predictions. There is no need to setup tests or determination personalization rules, and no more need to set up user segments to run personalization on. Such capabilities reduce the analysis efforts required by a marketing team. To provide the automatic/autonomous personalization, any content item/component on a website may be selected to turn on the auto personalization feature (i.e., to let machine learning drive personalization). Content (e.g., variations) is merely added to a component, the "Machine Learning" or "ML" button is pushed, the content is published, and auto personalization service 414 is automatically/autonomously activated. There is no need to manually set up user segments. Instead, the ML of embodiments of the invention provide user segment insights from analyzed data.

With the automated personalization and segmentation service 414, the most relevant content may always be displayed to digital channel (e.g., website) visitors (thereby increasing a website publisher's/owner's return on investment). Further, time spent away from defining personalization rules and customer segments, may be utilized by marketing personnel to create different/more effective content. In addition, segment analytics helps to analyze visitor interactions with every piece of content helping to refine the content creation further (i.e., the analytics enable deeper insights into customer behavior). An additional advantage is the ability to deliver real-time personalization at scale (i.e., personalization may be adjusted in real time and at scale without worrying about updating segmentation and personalization rules as a business grows).

Additional add-ons that may be utilized with the auto-personalization service 414 include a cloud-based installation (e.g., AZURE, AWS, SITECORE MANAGED CLOUD, etc.), and a dashboard that may provide personalization and AI insights.

The auto-personalization service 414 may utilize various different method to identify the mutual information and perform clustering/segmentation. In particular, as described above, the general case is referred to as soft clustering, there is a constraint version which is referred to as hard clustering, and there is an incremental version. Overviews of the different variations within each of these categories are described below.

Single-Thread Hard Mutual Information Clustering

Figure 5A:
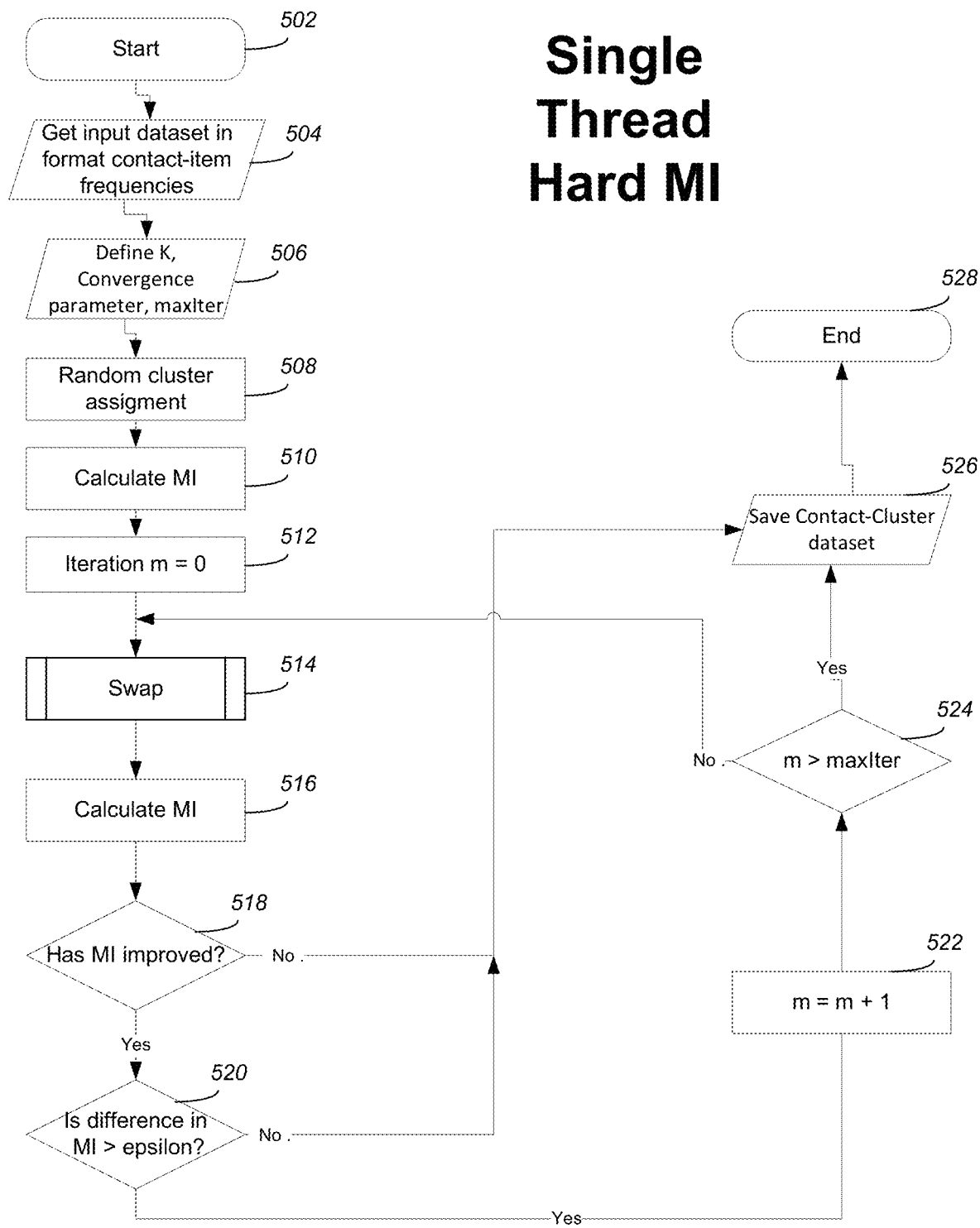
FIGS. 5A and 5B illustrate the single thread hard mutual information clustering process based on maximizing mutual information in accordance with one or more embodiments of the invention.
Figure 5B:
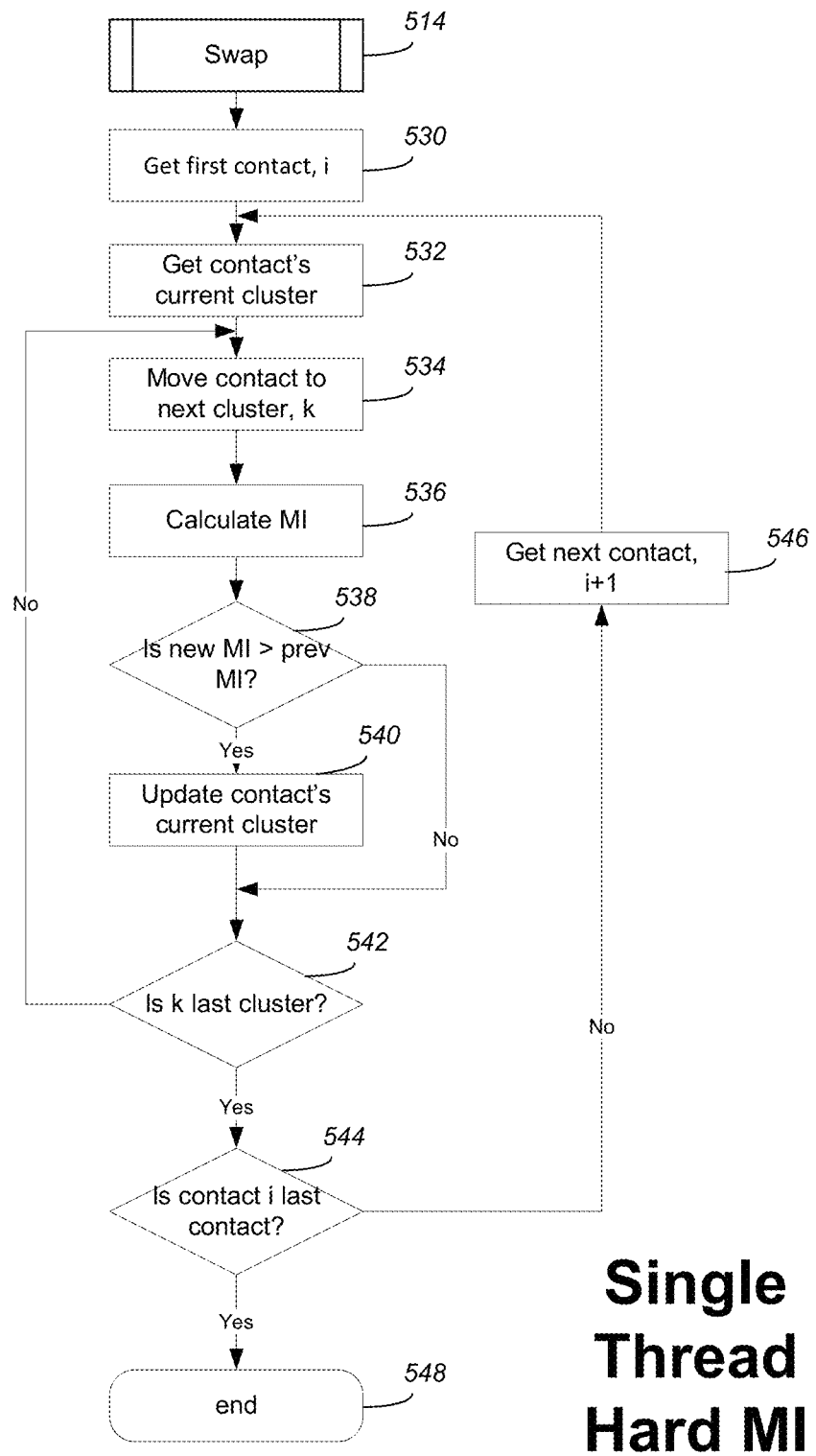

FIGS. 5A and 5B illustrate the single thread hard mutual information clustering process based on maximizing mutual information in accordance with one or more embodiments of the invention.

The process starts at step 502.

At step 504, the input data set is obtained in the format contact-item frequencies {U,C}.

At step 506, the expected number of clusters K, the maximal number of iterations M, and the convergence parameters e are defined.

Initialization is performed in steps 508-512. At step 508, a random cluster is assigned to each contact U from the range [1,k]. At step 510, the initial mutual information (MI) ($I_0$) is calculated/computed, and an iteration count m is initialized to 0 at step 512.

Steps 514-524 are repeated until various conditions are met. At step 514, a swap operation is performed (if needed), the MI is calculated at step 516, and a determination if made at step 518 regarding whether the MI has improved (and if so, a further determination is made regarding whether the MI is greater than a predefined value epsilon at step 520). If the difference in MI is greater than epsilon, the iteration count is advanced at step 522 to determine whether the maximum number of iterations have been conducted at step 524. The details for FIG. 5A are consistent with the following pseudocode.

```
Inputs: Contact-Item frequency dataset, {U, C}
   Expected number of clusters, k
   Maximal number of iterations, M
   Convergence parameter, e
Outputs: Contact-Cluster dataset, {U, k}
Initialization:
   m = 0
   Assign random cluster to each contact from range [1, k]
   Compute I₀
Repeat:
   For contact i in U do:
      For cluster k' not equal to current cluster k do:
         Compute I_{m+1} after swapping user i from cluster k to k'
         If I_{m+1} > I_m then make the swap
         Get next k'
      Get next contact i
      m = m +1
Until:
   I_{m+1} - I_m < e OR m > M
```

FIG. 5B illustrates the details for the swap operation 514 and iterating through the contacts and clusters as part of the swap operation 514. As set forth in the pseudocode, the outer for loop processes all of the contacts (i.e., via a determination if the last contact has been processed at step 544—if so, the swap process is complete at step 548, and if not, the next contact is retrieved at step 546). Thus, the outer for loop begins with getting the first contact, i at step 530. The inner for loop processes all of the clusters for each contact (i.e., via a determination if the last cluster has been processed at step 542). At step 532, the contact's current cluster is obtained at step 532. At step 534, the contact is moved to the next cluster, k. The mutual information between the two clusters is calculated at step 536 (i.e., "Compute $I_{m+1}$ after swapping user i from cluster k to k'"), and a determination is made at step 538 regarding whether the new MI is greater than the previous MI (i.e., "If $I_{m+1}>I_m$"). If the new MI is greater, then the swap occurs and the contact's current cluster is updated at step 540.

Returning to FIG. 5A, once all of the iterations have been performed and/or the MI difference is de minimis (e.g., below a defined threshold epsilon), the outputs (i.e., the Contact-Cluster dataset, {U, k}) are saved at step 526 and the process concludes at step 528.

Multi Thread Hard Mutual Information Clustering

Figure 6A:
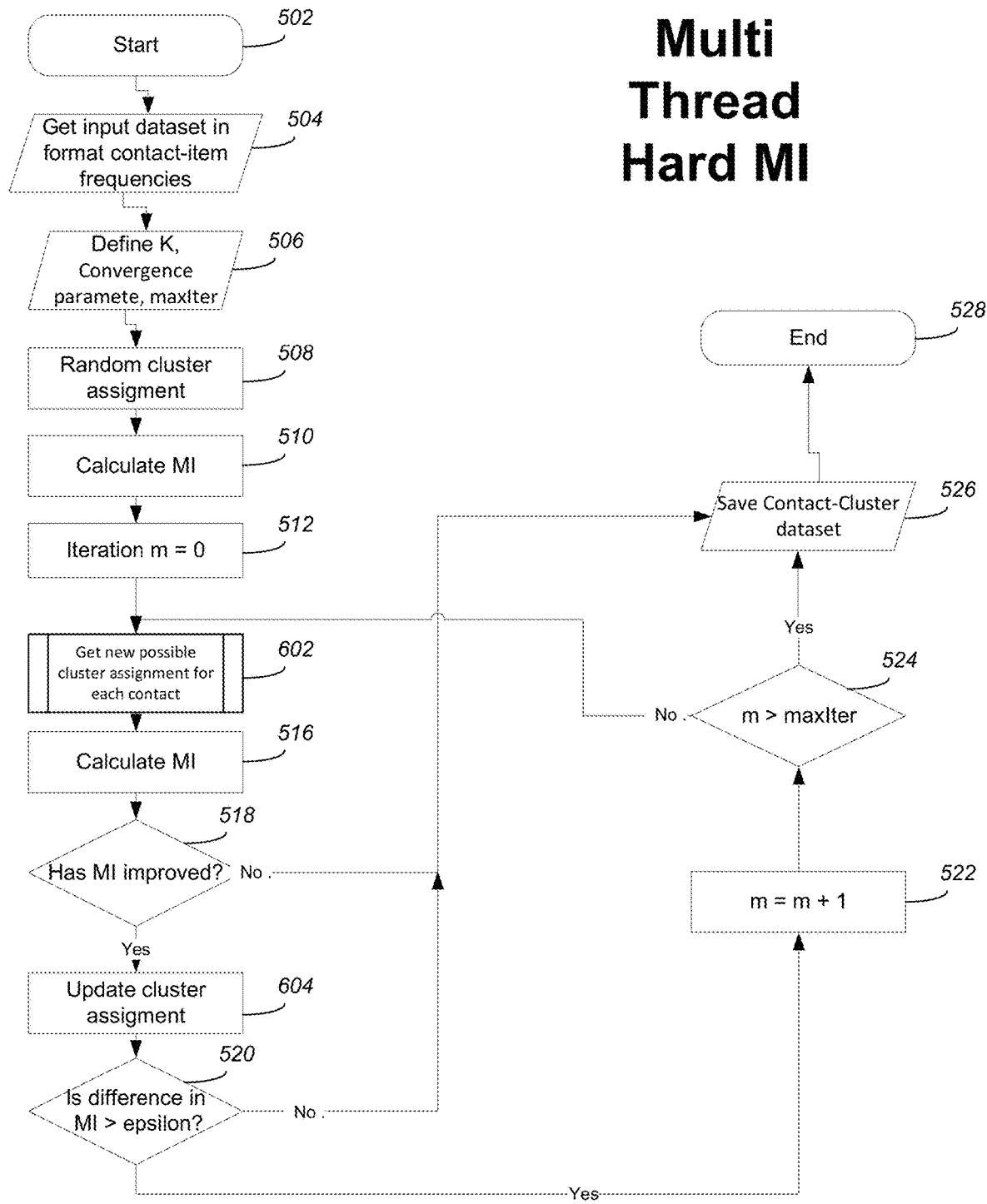
FIGS. 6A, 6B, and 6C illustrate the multi thread hard mutual information clustering process based on maximizing mutual information in accordance with one or more embodiments of the invention.
Figure 6B:
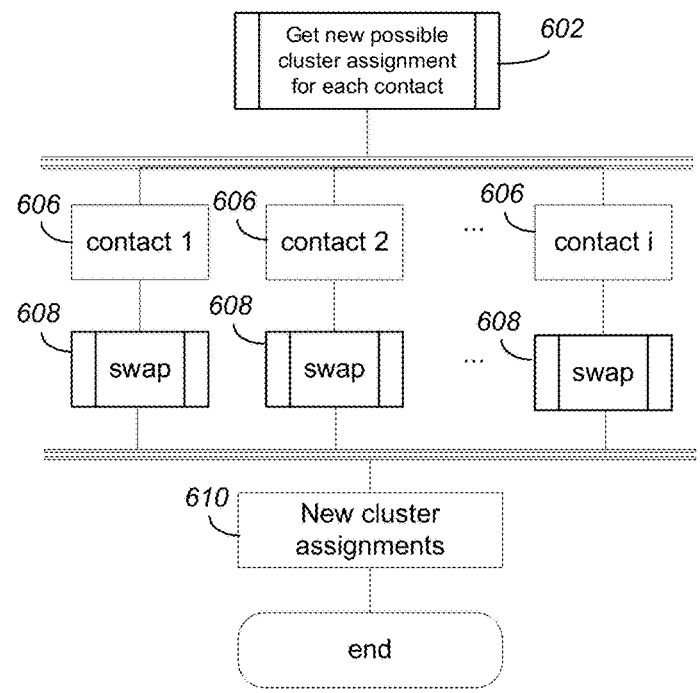
Figure 6C:
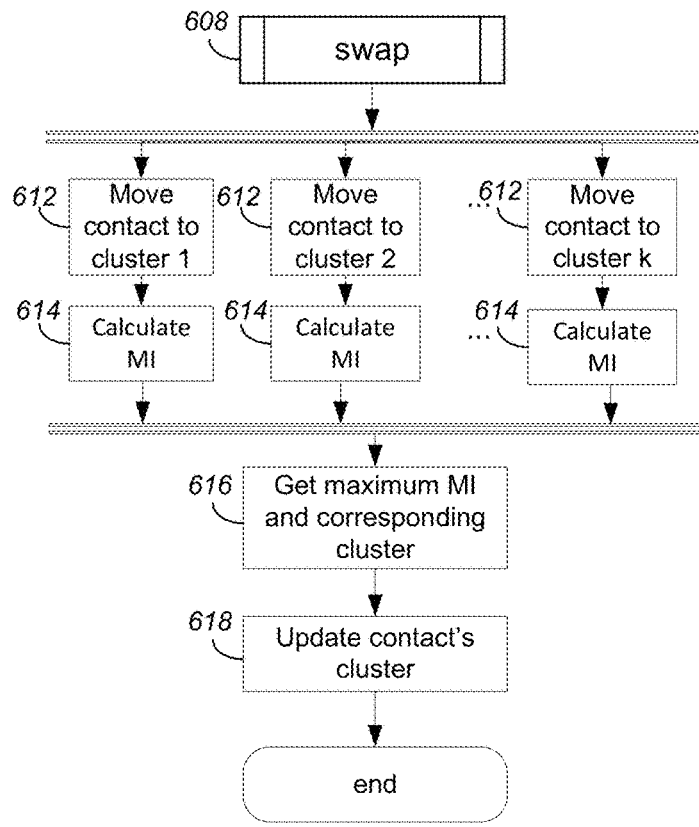

FIGS. 6A, 6B, and 6C illustrate the multi thread hard mutual information clustering process based on maximizing mutual information in accordance with one or more embodiments of the invention.

The steps of FIG. 6A-6C reflect the following pseudocode.

```
Inputs: Contact-Item frequency dataset, {U, C}
   Expected number of clusters, k
   Maximal number of iterations, M
   Convergence parameter, e
Outputs: Contact-Cluster dataset, {U, k}
Initialization:
   m = 0
   Assign random cluster to each contact from range [1, k]
   Compute I₀
Repeat:
   For contact i in U do simultaneously:
      For every cluster k' not equal to current cluster k do:
         simultaneously:
         Compute I^{k'}_{m+1} after swapping user i from cluster k to k'
      Get max {I^{k'}_{m +1}} and assign corresponding cluster k' to contact i
      Compute I_{m+1}
      If I_{m+1} < I_m then break and revert to previous cluster assignment
      m = m +1
Until:
   I_{m+1} - I_m < e OR m > M
```

The steps of FIG. 6A are similar to that of FIG. 5A but for steps 602 and 604. In particular, instead of performing the swap operation 514, the multi-thread process gets the new possible cluster assignment for each contact at step 602. If the MI has improved (as determined at step 518), the multi thread operation updates the cluster assignment at step 604. In addition, rather than processing the contacts serially, the multi-thread MI processes every contact I in each cluster in parallel/simultaneously.

FIG. 6B illustrates the details for getting the new possible cluster assignments for each contact (i.e., step 602). As illustrated, the cluster of each contact 606 is swapped at 608 in parallel, resulting in new cluster assignments 610.

FIG. 6C illustrates the details of the swap operation 608 of FIG. 6B. At step 612, the contacts are moved to a next/different cluster and at step 614, the MI is calculated for each contact in parallel. At step 616, the maximum MI and the corresponding cluster is obtained, and the contact's cluster is updated (to the cluster with the max MI) at step 618. As indicated in the pseudocode above, if the new MI is less than the prior MI, then the previous cluster assignment is used. In other words, the contact is assigned to a cluster with the maximum MI.

Multi Thread Incremental Hard Mutual Information Clustering

FIGS. 7A-7D illustrate the multi thread incremental hard mutual information clustering process based on maximizing mutual information in accordance with one or more embodiments of the invention.

The steps of FIG. 7A-7D reflect the following pseudocode.

```
Inputs: Increment, Contact-Item frequency dataset, {U, C$^n$}
    Aggregated data, Cluster-Item frequencies, from previous run,
    {k,
C$^p$}
    Expected number of clusters, k
    Maximal number of iterations, M
    Convergence parameter, e
Outputs: Contact-Cluster dataset, {U, k}
    New aggregated data, Cluster-Item, {k, C = C$^n$ + C$^p$}
Initialization:
    m = 0
    Assign random cluster to each contact from range [1, k]
    Compute cluster-item frequencies {k, C}$_0$ using contact-item
frequencies {U, C$^n$} and cluster-item frequencies {k, C$^p$}
    Compute I$_0$
Repeat:
    For every contact i in U do simultaneously:
        For every cluster k' not equal to current cluster k do
        simultaneously:
            Compute frequency delta Δ{k, C}$^{i,k'}$ for swapping
        user i from cluster k to k'
            Compute I$^{k'}_{m+1}$ using combination of {k, C}$_m$ and
    Δ{k, C}$^{i,k'}$
        Get max {I$^{k'}_{m+1}$} and assign corresponding cluster k' to
    contact i
    Compute new cluster-item frequencies {k, C}$_{m+1}$ and I$_{m+1}$
    If I$_{m+1}$ < I$_m$ then break and revert to previous cluster assignment
    m = m +1
Until:
    I$_{m+1}$ - I$_m$ < e OR m > M
```

Figure 7A:
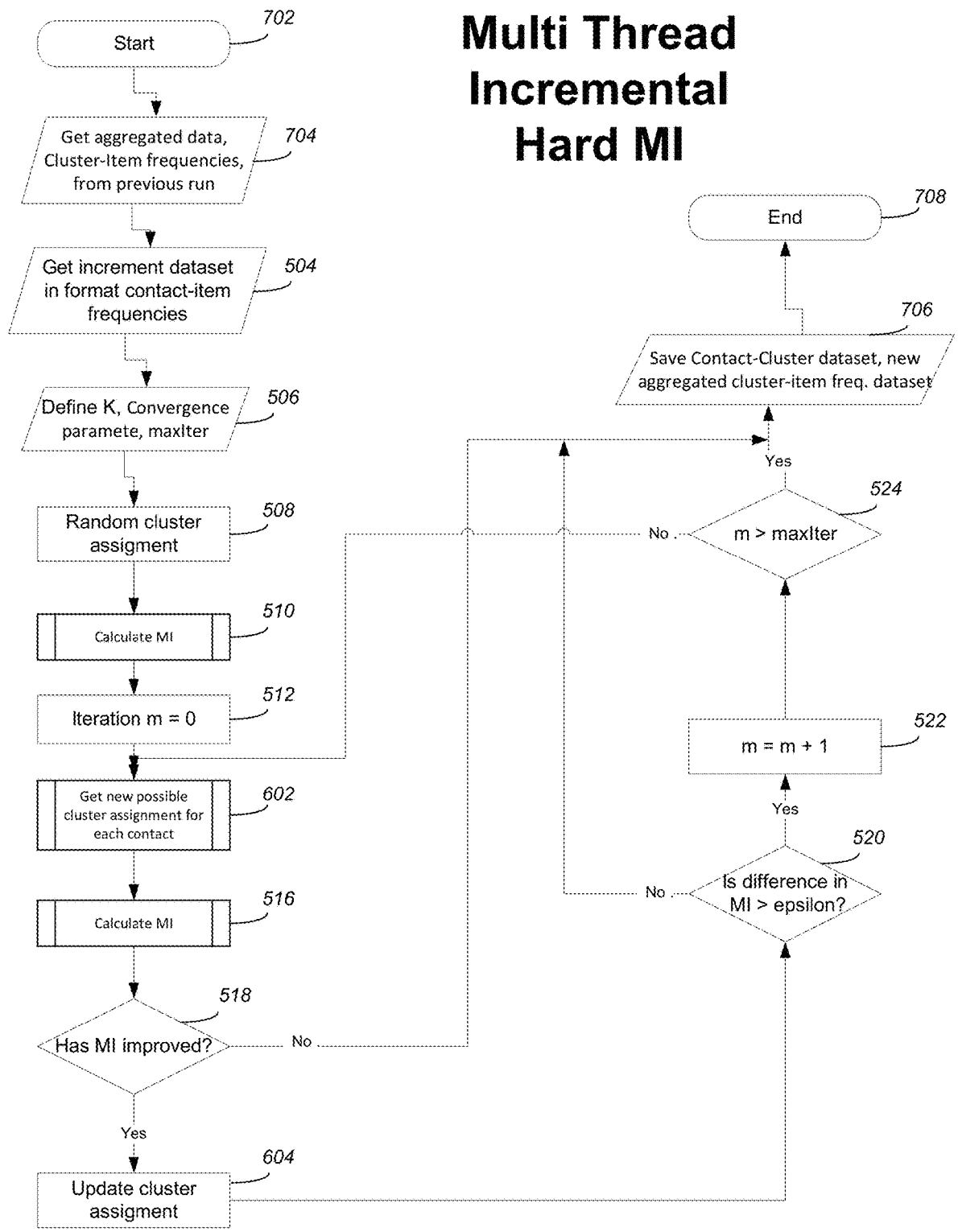

As reflected in the pseudo code and FIGS. 7A-7D, the incremental clustering has various similarities to the prior flows of FIGS. 5A-6C. Referring to FIG. 7A, the process starts at step 702 and at step 704, the aggregated data and cluster-item frequencies from a prior run are acquired. After step 704, the process continues similar to that of FIGS. 5A and 6A. After completing the iterations, the contact-cluster dataset and new aggregated cluster-item frequency dataset are saved at step 706, and the process is complete at step 708.

FIG. 7B illustrates the details for getting the new possible cluster assignments for each contact (i.e., step 602 of FIGS. 6A and 7A). As illustrated, the steps are the same as that of FIG. 6B where the cluster of each contact 606 is swapped at 608 in parallel, resulting in new cluster assignments 610.

FIG. 7C illustrates the details of the swap operation 608 of FIGS. 6B and 7B and includes the same steps as that of FIG. 6B.

FIG. 7D illustrates the details for calculating the MI in step 516 of FIG. 7A (i.e., the steps within the repeat loop of the pseudocode above). In particular, at step 710, the aggregated data from a previous run is joined with the current input data. At step 712, the MI for the joined data is calculated (i.e., in the pseudocode "Compute new cluster-item frequencies {k, C}$_{m+1}$ and I$_{m+1}$").

Multi Thread Soft Mutual Information Clustering

Figure 8A:
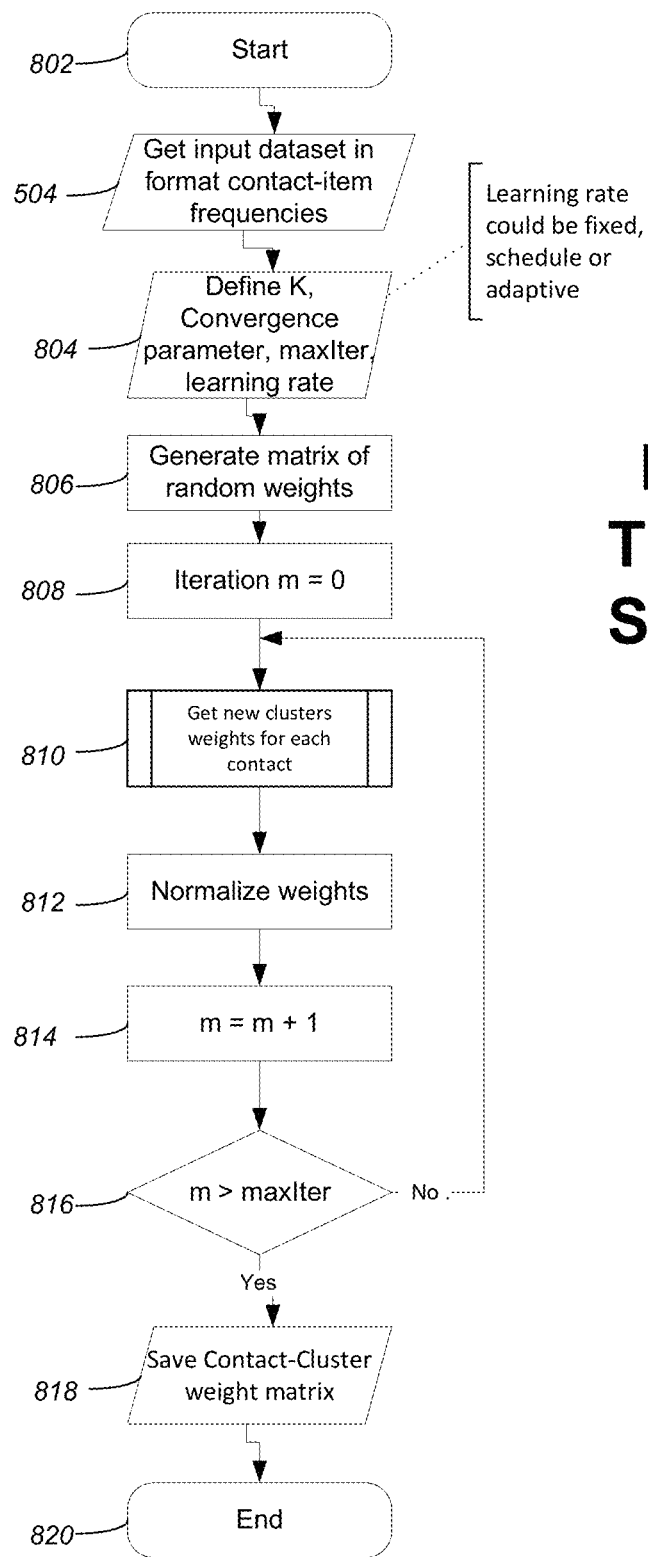
FIGS. 8A-8B illustrate the multi thread soft mutual information clustering process based on maximizing mutual information in accordance with one or more embodiments of the invention.
Figure 8B:
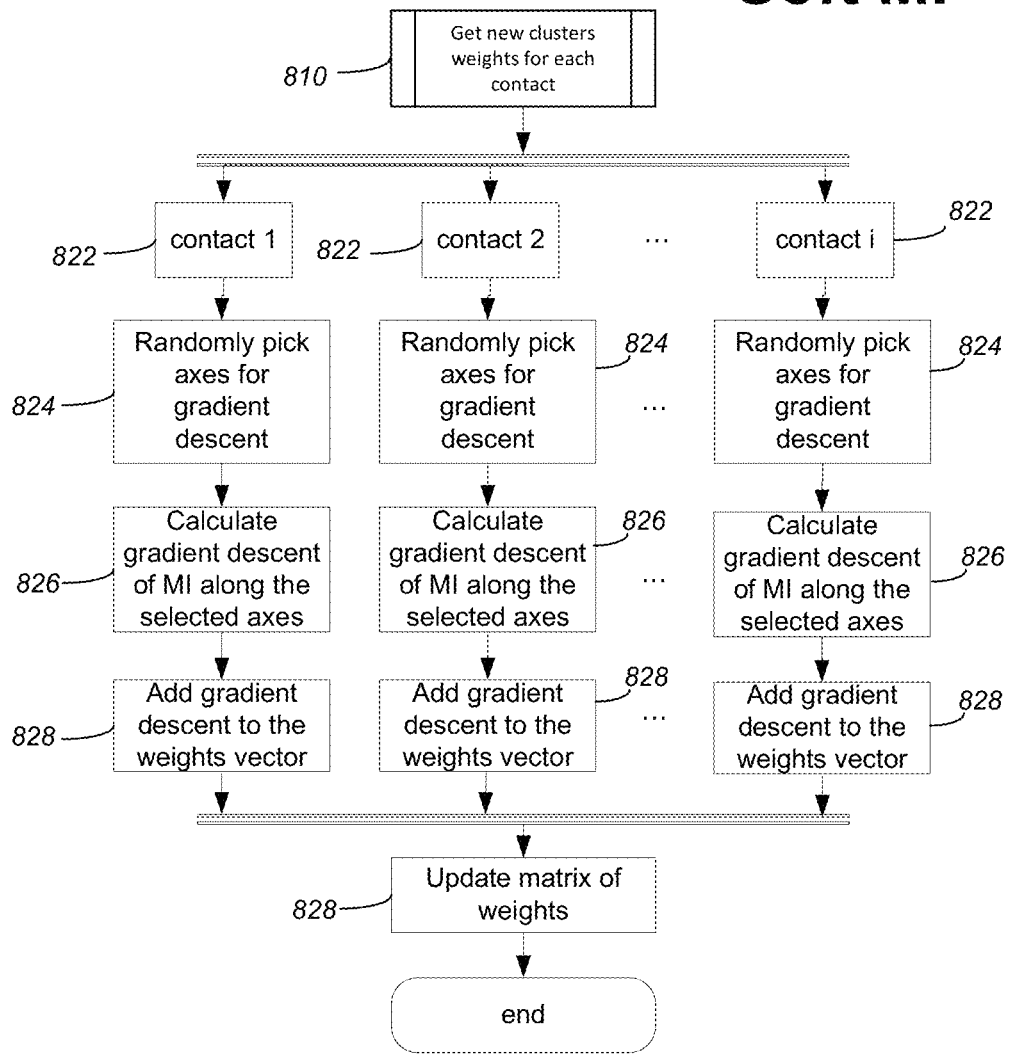

FIGS. 8A-8B illustrate the multi thread soft mutual information clustering process based on maximizing mutual information in accordance with one or more embodiments of the invention.

The steps of FIG. 8A-8B reflect the following pseudocode.

```
Inputs: Contact-Item frequency dataset, {U, C}
    Expected number of clusters, k
    Maximal number of iterations, M
    Convergence parameter, e
    Learning rate, α
Outputs: Contact-Cluster weight matrix, {U, w}
Initialization:
    Generate random weight matrix w with dimensions [U x k]
    m = 0
Repeat:
    For every contact i in U do simultaneously:
        Randomly pick a subset of axes for gradient descent
        Calculate gradient vector for MI function for the selected
    axes
        Update the cluster weights w for the contact using learning
    rate α
    Normalize contact-cluster weight matrix {U, w}
    m = m +1
Until:
    m > M
```

The process starts at step 802 and similar to FIGS. 5A, 6A, and 7A, the input dataset is obtained in format contact-item frequencies at step 504. At step 804, in addition to defining K, the convergence parameter, and the maximum number of iterations (as performed in the prior methods), the learning rate is defined. The learning rate may be fixed, scheduled, or adaptive.

At step 806, to initialize the process, a matrix of random weights is generated (e.g., with dimensions [U×k]), and the number of iterations is initialized to 0 at step 808.

Steps 810-816 are repeated for every contact.

At step 810, the new cluster's weights are acquired for each contact. The weights are normalized at step 812, the iteration counter is increased at step 814, and if the maximum number of iterations has been reached (as determined at step 816), the process proceeds to step 818 (if not, the process repeats beginning at step 810).

At step 818, the contact-cluster weight matrix is saved, and the process is complete at step 820.

FIG. 8B illustrates the details for step 810 getting new cluster's weights for each contact. The steps for each contact 822 are performed in parallel/simultaneously.

At step 824, an axis for the gradient descent is randomly picked.

At step 826, the gradient descent of the MI along the selected axis is calculated.

At step 828, the calculated gradient descent is added to the weights vector and the matrix of weights is updated at step 828 (i.e., the cluster weights w are updated for the contact using learning rate α).

Multi Thread Incremental Soft Mutual Information Clustering

Figure 9A:
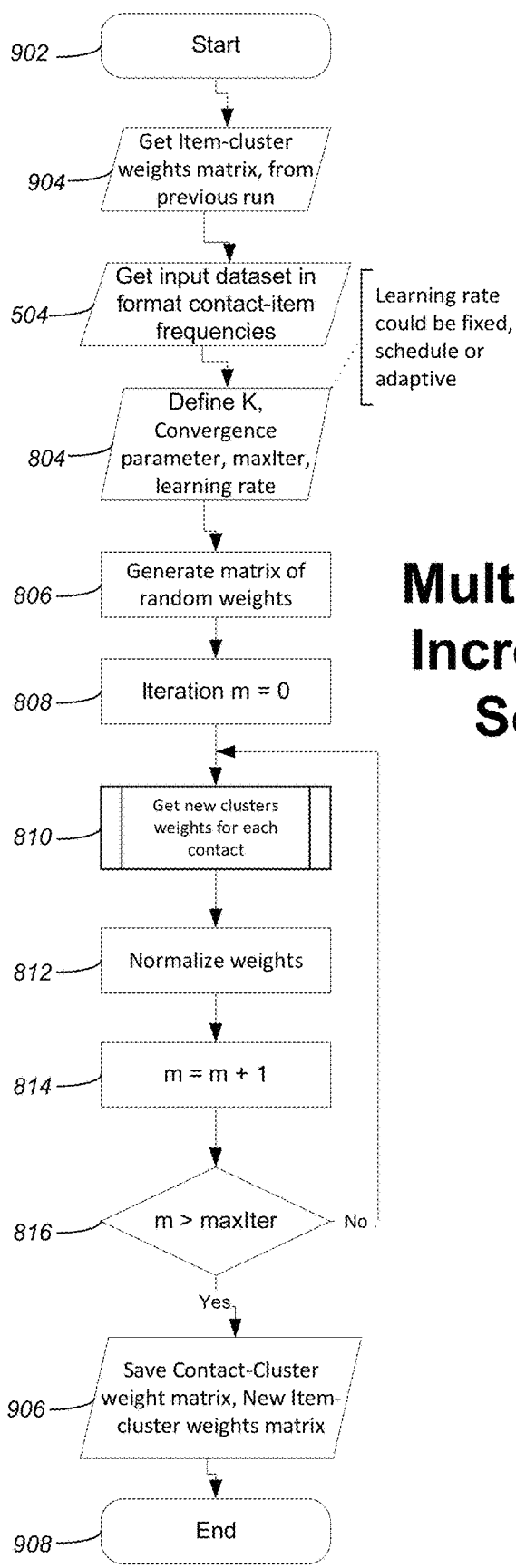
FIGS. 9A-9C illustrate the multi thread incremental soft mutual information clustering process based on maximizing mutual information in accordance with one or more embodiments of the invention.
Figure 9B:
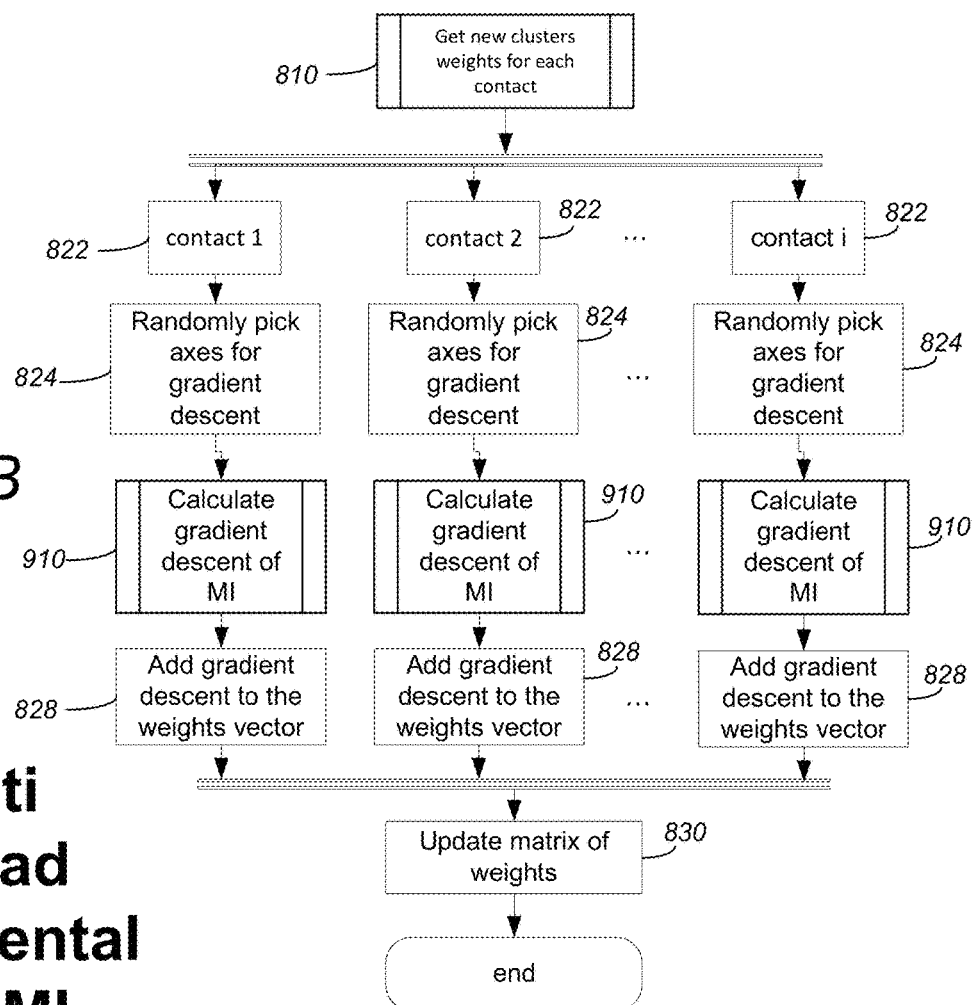
Figure 9C:
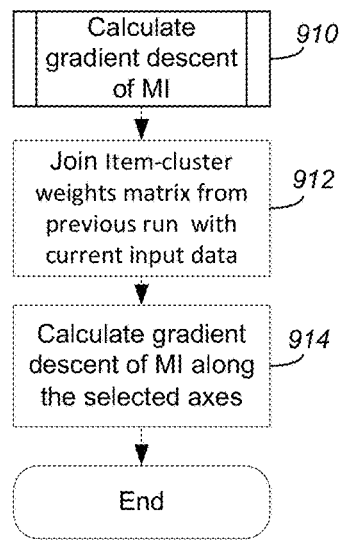

FIGS. 9A-9C illustrate the multi thread incremental soft mutual information clustering process based on maximizing mutual information in accordance with one or more embodiments of the invention.

The steps of FIG. 9A-9C reflect the following pseudocode.

```
Inputs: Daily Contact-Item frequency dataset, {U, C$^n$}
    Item-cluster weights matrix, C$^p_w$ from previous run, with
dimensions [C$^p$, k]
    Expected number of clusters, k
    Maximal number of iterations, M
    Convergence parameter, e
    Learning rate, α
Outputs: Contact-Cluster weight matrix, {U, w}
    New Item-cluster weights matrix, C$_w$, with dimensions [C = C$^n$ +
    C$^p$,
k]
```

-continued

```
Initialization:
    Generate random weight matrix w with dimensions [U x k]
    m = 0
Repeat:
    For every contact i in U do simultaneously:
        Randomly pick a subset of axes for gradient descent
        Calculate gradient vector for MI function for the selected
        axes using item-cluster weights matrix $C^p_w$
            Update the cluster weights w for the contact using learning
        rate α
        Normalize contact-cluster weight matrix {U, w}
        Compute new item-cluster weights matrix, $C_w$ using contact-item
        frequencies {U, $C^n$}, item-cluster weights matrix $C^p_w$ and matrix w
    m = m +1
Until:
    m > M
```

The steps of FIG. 9A are similar to that of FIG. 8A but include some variations. Specifically, once the process starts at step 902, the item-cluster weights matrix is obtained from the previous run at step 904. The steps 504 and 804-816 then proceed similar to that of FIG. 8A. However, at step 906, the contact-cluster weight matrix as well as a new item-cluster weights matrix is saved, with the process concluding at step 908.

FIG. 9B illustrates the steps for getting the new clusters' weights for each contact at step 810 of FIG. 9A. Steps 822-824 of FIG. 9B are similar to that of FIG. 8B. During step 910, the gradient descent of the MI function is calculated for a selected axis and at step 828, the gradient descent is added to the weights vector (e.g., using the item-cluster weights matrix). The remaining steps of FIG. 9B are similar to that of FIG. 8B.

FIG. 9C illustrates the steps for calculating the gradient descent of the MI during step 910. As illustrated, the item-cluster weights matrix from a previous run is joined with current input data at step 912. At step 914, the gradient descent of the MI is calculated along the selected axis.

General Logical Flow

Figure 10:
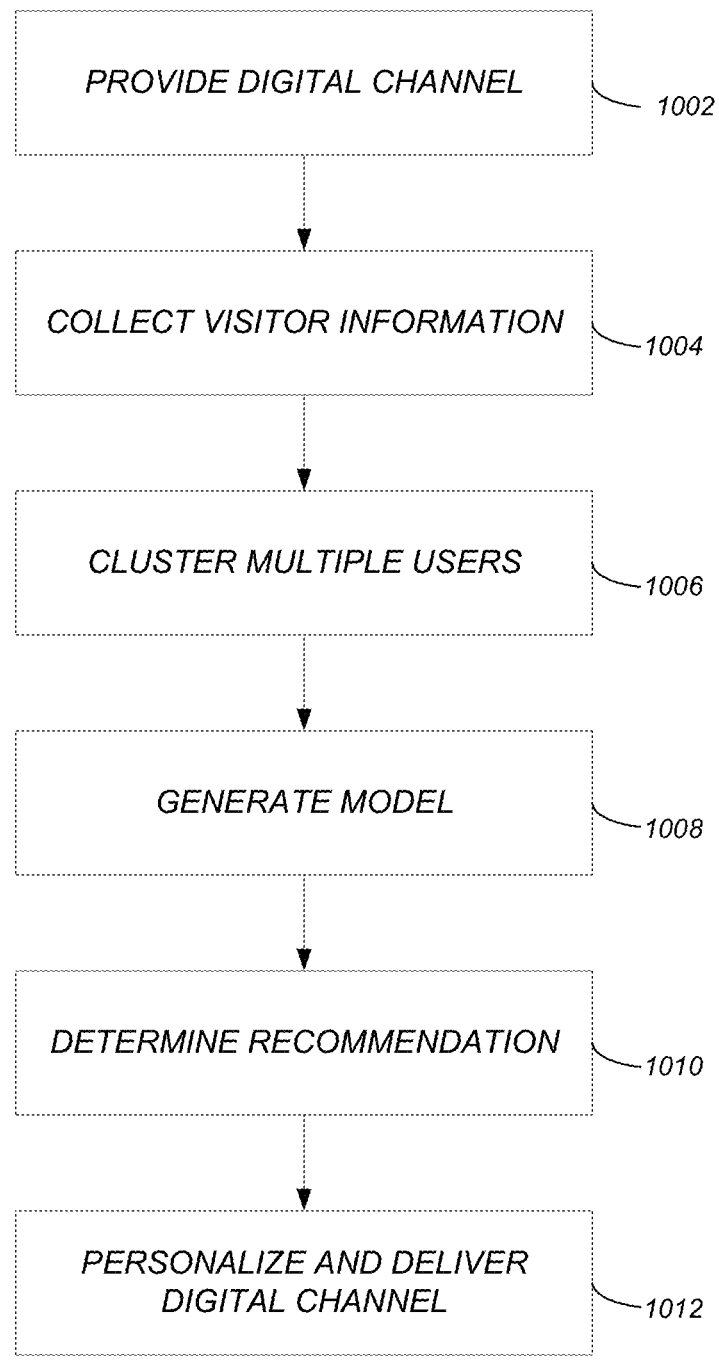
FIG. 10 illustrates an alternative view of the logical flow for personalizing a digital channel in accordance with one or more embodiments of the invention.

In view of the above, FIG. 10 illustrates an alternative view of the logical flow for personalizing a digital channel in accordance with one or more embodiments of the invention.

At step 1002, a digital channel is provided to multiple users.

At step 1004, visitor information is collected at each visit of each of the multiple users to the digital channel. The visitor information consists of data about each visit, and each visit consists of multiple content items that are presented via the digital channel. In some embodiments, the visitor information may also include the content item presented during each visit, how the content item was assembled, actions of each user during each visit, and profile information of each user. Alternative/in addition, the visitor information may consist of a unique identifier of the content item provided to each user during each visit. Further, the visitor information may consist of an outcome of each visit. Such an outcome consists of an action by one or more of the multiple users that triggers a gain to a business that is the subject of the digital channel. Also, the outcome of each visit may be an indirect action by one or more of the multiple users.

At step 1006, the multiple users are autonomously clustered. The clustering segments a user population into two or more behavioral groups. Further, the clustering maximizes mutual information between the multiple users in an assigned behavioral group and one or more of the multiple content items.

At step 1008, based on the clustering, a model for an interaction between each of the multiple users and each of the multiple content items is generated. The model estimates a score for each interaction. Further, the model is updated at a defined interval based on the visits of the multiple users to the digital channel. The model generation may also include the performance of regression analysis that predicts an outcome as a function of the segment and contextual data. Alternatively, or in addition, the model generation may utilize Baysian interference and an explore-exploit mechanism to determine how to personalize the digital channel for the specific user.

At step 1010, based on the score, a determination is made regarding which of the multiple content items to recommend to a specific user of the multiple users. The determining jointly maximizes an outcome and a learning speed of the model.

At step 1012, the digital channel is personalized for and delivered to the specific user based on the recommended multiple content items.

Further to the above, the clustering, as described above, may include soft and/or hard clustering utilizing single/multiple threads. In one or more embodiments, generating a user-item matrix (A) is generated that sets, for each user (V) of the multiple users and each content item (C) of the multiple content items, a value monotonic to an aggregated outcome of all visits for each user (V). The user-item matrix (A) is decomposed into a matrix P and a matrix Q, wherein matrix P holds a decomposition of each user V into a set of K principal behaviors described by the matrix Q. Thereafter, a measure $w_{vk}$ of how representative a principal behavior k is for each user v, and a measure $\varphi_{kc}$ of success of each content item c in each principal behavior k may be determined. An outcome for each content item C in each principal behavior K based on $w_{vk}$ and $\varphi_{kc}$ may then be estimated, which in turn is then used to estimate the score.

To perform the clustering, the mutual information may be maximized based on a determination of a set of weighted parameters. The weights of the parameters may be determined using a gradient descent method that determines local minimum by taking steps proportional to a negative of a gradient. The maximizing determination may stop when a value of the mutual information does not accrue more than a pre-determined convergence threshold. In further embodiments, the multiple users may be constrained such that each of the multiple users can only belong to one of the two or more behavioral groups (where the score for each interaction is based on information in a user's associated behavioral group).

To perform single threaded processing, the autonomously clustering may be performed using a single thread serially for each user-contact item pair. Alternatively, for multiple threaded processing, the mutual information may be maximized by moving all of the multiple users between behavioral groups in parallel to determine which behavioral group maximizes the mutual information.

Clustering Method Details

Prior art systems may utilize a greedy algorithm of mutual information maximization for recommending items to users. Embodiments of the invention utilize several novel methods/algorithms leveraging the mutual information. In particular, embodiments of the invention may utilize a greedy algorithm for clustering based on maximizing mutual information.

Intuitively, mutual information measures the information that two variables share. In fact, it estimates how much knowing one reduces uncertainty about the other. For example, if U and C are independent, then knowing U does not give any information about C and vice versa, so their mutual information is zero I(U,C)=0.

Here, the concept of mutual information is used in regards with visitors and contents. Mutual information is described in a general case referred to as soft clustering, a constraint version which is called hard clustering and an incremental version.

Mutual Information with Soft Clustering

This section provides a high-level description of the general case referred to as a soft clustering method.

We start with a set of users U for which items from set V may be shown. For example, assume a random variable U with $N_i$ possible values representing contacts visiting a website, random variable J with $N_j$ possible values representing the features of the website and random variable K with $N_k$ elements representing assignment of contacts to clusters:

$i \in U, i=1, \ldots N_i$-contacts, $j \in J, j=1, \ldots N_j$-items,
$k \in K, k=1, \ldots N_k$-clusters  (7)

The goal is to calculate and maximize mutual information between random variables J and K. When a website visit is made, it is assumed that the probability that the visit is made by i-th contact is:

$$P(i) = \frac{1}{N_i}, \quad (8)$$

We express the probability of feature j being exposed in a visit, with a condition that visit is made by contact i, as:

$P(j|i)=\phi_{ij}$  (9)

We express the probability that contact i belongs to cluster k as:

$P(k|i)=w_{ik}$,  (10)

We express the probability of exposing feature j with a condition that current contact belongs to cluster k as:

$P(j|k)=\varphi_{kj}$,  (11)

We calculate the joint probability of a visit by contact i belonging to cluster k using (8) and (10)

$$P(k, i) = P(k|i)P(i) = \frac{1}{N_i} w_{ik} \quad (12)$$

We calculate probability of a visit by a contact that belongs to cluster k as a sum of joint probabilities (12) across all contacts $$P(k) = \sum_i P(k, i) = \frac{1}{N_i} \sum_i w_{ik} \quad (13)$$

We calculate probability of exposing feature j as a sum of joint probabilities of exposing feature j to contact i and using (8) and (9)

$$P(j) = \sum_i P(i, j) = \sum_i P(j|i)P(i) = \frac{1}{N_i} \sum_i \phi_{ij} \quad (14)$$

We assume that the probability of assigning contact i to cluster k does not change during visit and does not depend on whether the contact is exposed to any specific feature j during the visit:

$P(k|i,j)=P(k|i)=w_{ik}$  (15)

We express the joint probability of feature j being exposed to contact i belonging to cluster k as:

$$P(i, j, k) = P(i)P(j|i)P(k|i, j) = P(i)P(j|i)P(k|i) = \frac{1}{N_i} \phi_{ij} w_{ik} \quad (16)$$

We express the joint probability of feature j being exposed to a contact belonging to cluster k as a sum of joint probabilities in (16)

$$P(j, k) = \sum_i P(i, j, k) = \frac{1}{N_i} \sum_i \phi_{ij} w_{ik} \quad (17)$$

Using (14) and (17) we can derive the formula for $\varphi_{kj}$:

$$\varphi_{kj} = P(j|k) = \frac{P(j, k)}{P(k)} = \frac{\frac{1}{N_i} \sum_i \phi_{ij} w_{ik}}{\frac{1}{N_i} \sum_i w_{ik}} = \frac{\sum_i \phi_{ij} w_{ik}}{\sum_i w_{ik}} \quad (18)$$

And verify the derivations:

$$P(k, j) = P(j|k)P(k) = \frac{1}{N_i} \varphi_{kj} \cdot \sum_i w_{ik} = \frac{1}{N_i} \sum_i \phi_{ij} w_{ik} \quad (19)$$

We calculate mutual information for random variables K and J as $$I(K, J) = \quad (20)$$

$$\Sigma_{k,j} P(k, j) \log \frac{P(k, j)}{P(k)P(j)} = \Sigma_{k,j} \frac{1}{N_i} (\Sigma_i \phi_{ij} w_{ik}) \log \frac{\frac{1}{N_i} \Sigma_i \phi_{ij} w_{ik}}{\frac{1}{N_i} \cdot \Sigma_i w_{ik} \cdot P(j)} =$$

$$\Sigma_{kj} \frac{1}{N_i} (\Sigma_i \phi_{ij} w_{ik}) \log \frac{N_i \Sigma_i \phi_{ij} w_{ik}}{\Sigma_i w_{ik} \cdot \Sigma_i \phi_{ij}} = \frac{1}{N_i} \Sigma_{kj} \left[ \overbrace{(\Sigma_i \phi_{ij} w_{ik})}^{A} \log \overbrace{\frac{N_i \Sigma_i \phi_{ij} w_{ik}}{\Sigma_i \phi_{ij} \Sigma_i w_{ik}}}^{B} \right]$$

Let's annotate the first multiplier under sum as A and the second multiplier as B:

$$A = \sum_i \phi_{ij} w_{ik} \quad (21)$$

$$B = \log \frac{N_i \Sigma_i \phi_{ij} w_{ik}}{\Sigma_i \phi_{ij} \Sigma_i w_{ik}} = \log N_i + \log \sum_i \phi_{ij} w_{ik} - \log \sum_i \phi_{ij} - \log \sum_i w_{ik} \quad (22)$$

In order to use gradient descent, we derive partial derivative for mutual information with respect to $w_{ik}$.

We can express (20) and (21) in a general form as:

$\Sigma_i f(x_i) = \tau_{i \neq i'} f(x_i) + f(x_{i'})$,  (23)

Partial derivative of (23) with respect to xi is:

$$\frac{\partial \Sigma_i f(x_i)}{\partial x_{i'}} = 0 + \frac{\partial f(x_{i'})}{\partial x_{i'}} \quad (24)$$

Using (23) and (24) we can express partial derivative of (23) with respect to $w_{ik}$ as $$\frac{\partial I(K, J)}{\partial w_{i'k'}} = \frac{1}{N_i} \Sigma_{k=k',j}[A'_{i'k'} B_{i'k'} + A_{i'k'} B'_{i'k'}] \quad (25)$$

Partial derivative of (21) with respect to $w_{ik}$ is $$A'_{i'k'} = \varphi_{ij} \quad (26)$$

Partial derivative of (22) with respect to $w_{ik}$ is $$B'_{i'k'} = \frac{\phi_{i'j}}{\Sigma_i \phi_{ij} w_{ik'} \ln 2} - \frac{1}{\Sigma_i w_{ik'} \ln 2} \quad (27)$$

Substituting A and B into (25) gives the formula for partial derivative $$\frac{\partial I(K, J)}{\partial w_{i'k'}} = \quad (28)$$

$$\frac{1}{N_i} \Sigma_{k=k',j}[A'_{i'k'} B_{i'k'} + A_{i'k'} B'_{i'k'}] = \frac{1}{N_i} \Sigma_j \left[ \phi_{i'j} \log \frac{N_i \Sigma_i \phi_{ij} w_{ik'}}{\Sigma_i \phi_{ij} \Sigma_i w_{ik'}} + \right.$$

$$\left. (\Sigma_i \phi_{ij} w_{ik'}) \left( \frac{\phi_{i'j}}{\Sigma_i \phi_{ij} w_{ik'} \ln 2} - \frac{1}{\Sigma_i w_{ik'} \ln 2} \right) \right] =$$

$$\frac{1}{N_i} \Sigma_j \left[ \phi_{i'j} \log \frac{N_i \Sigma_i \phi_{ij} w_{ik'}}{\Sigma_i \phi_{ij} \Sigma_i w_{ik'}} + \left( \phi_{i'j} - \frac{\Sigma_i \phi_{ij} w_{ik'}}{\Sigma_i w_{ik'}} \right) \frac{1}{\ln 2} \right]$$

An alternative way of describing the above follows. In particular, one may start with a set of users U for which items from set V may be shown. One counts user-item occurrences in the user-item $N_U \times N_V$ matrix P within each cell $p_{ij} = n_{ij}/N$ the frequencies of occurrence of item j for user i, where N is the total number of events. The mutual information between users U and items V is then estimated by $$I(U, V) = \sum_{ij} p_{ij} \log \left( \frac{p_{ij}}{p_i p_j} \right) \quad (29)$$

Now, we bucket the users in $K \ll N_U$ bins at random and compute the $K \times N_V$ matrix P' where in each cell we have $$p'_{kj} = \frac{N_k}{N} \quad (30)$$

where $N_k = \Sigma_{i \in bin\ k,j} n_{ij}$ is the sum of all occurrences in bin k. The mutual information for matrix P'

$$I'(U, V) = \sum_{kj} p'_{kj} \log \left( \frac{p'_{kj}}{p'_k p_j} \right) == \sum_{kj} p'_{kj} \log \left( \frac{p'_{kj}}{p'_k p_j} \right) = \quad (31)$$

-continued $$\sum_{kj} \frac{n'_{kj}}{N} \log \left( \frac{\frac{n'_{kj}}{N}}{\frac{N'_k}{N} \frac{N_j}{N}} \right) = \sum_{kj} \frac{n'_{kj}}{N} \log \left( \frac{N n'_{kj}}{N'_k N_j} \right) ==$$

$$\sum_{kj} \frac{n'_{kj}}{N} \log(N) - \sum_{kj} \frac{n'_{kj}}{N} \log(N_j) + \sum_{kj} \frac{n'_{kj}}{N} \log \left( \frac{n'_{kj}}{N'_k} \right) ==$$

$$\log(N) - \frac{1}{N} \left[ \sum_{kj} n'_{kj} \log(N_j) - \sum_{kj} n'_{kj} \log \left( \frac{n'_{kj}}{N'_k} \right) \right] ==$$

$$\log(N) - \frac{1}{N} \left[ \sum_{kj} n'_{kj} \log \left( \frac{N_j N'_k}{n'_{kj}} \right) \right]$$

is always smaller than I(U,V).

The algorithm is greedy and iteratively for each user checks what bin minimize this loss of information.

Continuing, one may assign users to K bins randomly, compute I'$_0$, and repeat. The following pseudocode illustrates such a process:

For user i in U
    For bin k' not equal to current bin k
        Compute I'$_{m+1}$ after swapping user i from bin k to k'
        If I'$_{m+1}$>I'$_m$ make the swap, else cancel it
    Until I'$_{m+1}$−I'$_m$<∈

The computation of I'$_{m+1}$ may use formula simplifications as the only terms with k or k' are changed. The simplified formula is:

$$I'_{m+1} - I'_m = \quad (32)$$

$$-\frac{1}{N} \left[ \sum_j n'_{k^+_{m+1}j} \log \left( \frac{N_j N'_{k^+_{m+1}}}{n'_{k^+_{m+1}j}} \right) + \sum_j n'_{k^-_{m+1}j} \log \left( \frac{N_j N'_{k^-_{m+1}}}{n'_{k^-_{m+1}j}} \right) \right] --$$

$$\frac{1}{N} \left[ \sum_j n'_{k^+_m j} \log \left( \frac{N_j N'_{k^+_m}}{n'_{k^+_m j}} \right) + \sum_j n'_{k^-_m j} \log \left( \frac{N_j N'_{k^-_m}}{n'_{k^-_m j}} \right) \right]$$

where $k^-$ cluster is a cluster from which user i will be swapped to a new cluster $k^+$.

Hardware Environment

Figure 11:
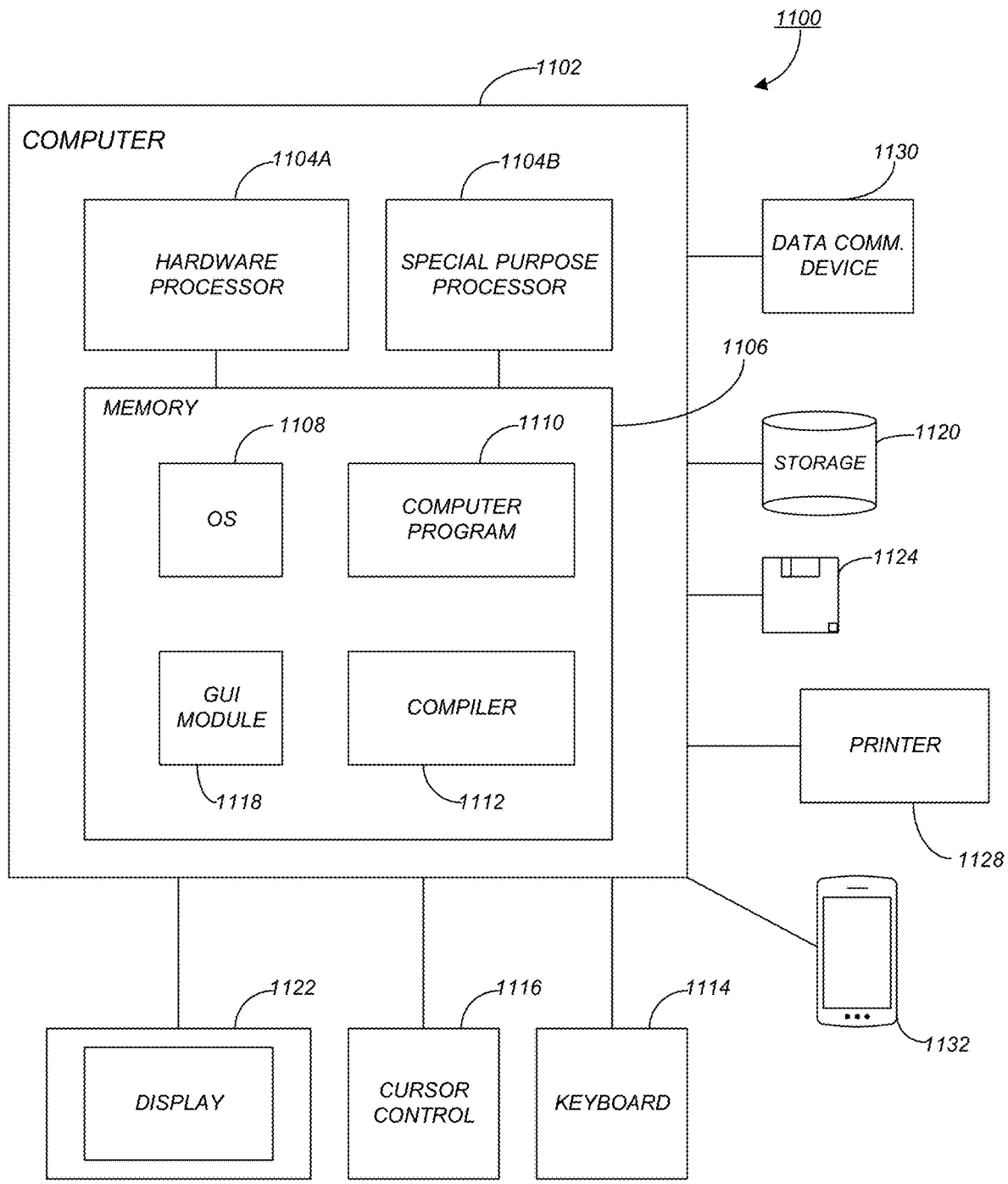
FIG. 11 is an exemplary hardware and software environment used to implement one or more embodiments of the invention.

FIG. 11 is an exemplary hardware and software environment 1100 (referred to as a computer-implemented system and/or computer-implemented method) used to implement one or more embodiments of the invention. The hardware and software environment includes a computer 1102 and may include peripherals. Computer 1102 may be a user/client computer, server computer, or may be a database computer. The computer 1102 comprises a hardware processor 1104A and/or a special purpose hardware processor 1104B (hereinafter alternatively collectively referred to as processor 1104) and a memory 1106, such as random access memory (RAM). The computer 1102 may be coupled to, and/or integrated with, other devices, including input/output (I/O) devices such as a keyboard 1114, a cursor control device 1116 (e.g., a mouse, a pointing device, pen and tablet, touch screen, multi-touch device, etc.) and a printer 1128. In one or more embodiments, computer 1102 may be coupled to, or may comprise, a portable or media viewing/listening device 1132 (e.g., an MP3 player, IPOD, NOOK, portable digital video player, cellular device, personal digital assistant, etc.). In yet another embodiment, the computer 1102 may comprise a multi-touch device, mobile phone, gaming system, internet enabled television, television set top box, or other internet enabled device executing on various platforms and operating systems.

In one embodiment, the computer 1102 operates by the hardware processor 1104A performing instructions defined by the computer program 1110 (e.g., a computer-aided design [CAD] application) under control of an operating system 1108. The computer program 1110 and/or the operating system 1108 may be stored in the memory 1106 and may interface with the user and/or other devices to accept input and commands and, based on such input and commands and the instructions defined by the computer program 1110 and operating system 1108, to provide output and results.

Output/results may be presented on the display 1122 or provided to another device for presentation or further processing or action. In one embodiment, the display 1122 comprises a liquid crystal display (LCD) having a plurality of separately addressable liquid crystals. Alternatively, the display 1122 may comprise a light emitting diode (LED) display having clusters of red, green and blue diodes driven together to form full-color pixels. Each liquid crystal or pixel of the display 1122 changes to an opaque or translucent state to form a part of the image on the display in response to the data or information generated by the processor 1104 from the application of the instructions of the computer program 1110 and/or operating system 1108 to the input and commands. The image may be provided through a graphical user interface (GUI) module 1118. Although the GUI module 1118 is depicted as a separate module, the instructions performing the GUI functions can be resident or distributed in the operating system 1108, the computer program 1110, or implemented with special purpose memory and processors.

In one or more embodiments, the display 1122 is integrated with/into the computer 1102 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1102 according to the computer program 1110 instructions may be implemented in a special purpose processor 1104B. In this embodiment, some or all of the computer program 1110 instructions may be implemented via firmware instructions stored in a read only memory (ROM), a programmable read only memory (PROM) or flash memory within the special purpose processor 1104B or in memory 1106. The special purpose processor 1104B may also be hardwired through circuit design to perform some or all of the operations to implement the present invention. Further, the special purpose processor 1104B may be a hybrid processor, which includes dedicated circuitry for performing a subset of functions, and other circuits for performing more general functions such as responding to computer program 1110 instructions. In one embodiment, the special purpose processor 1104B is an application specific integrated circuit (ASIC).

The computer 1102 may also implement a compiler 1112 that allows an application or computer program 1110 written in a programming language such as C, C++, Assembly, SQL, PYTHON, PROLOG, MATLAB, RUBY, RAILS, HASKELL, or other language to be translated into processor 1104 readable code. Alternatively, the compiler 1112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1110 accesses and manipulates data accepted from I/O devices and stored in the memory 1106 of the computer 1102 using the relationships and logic that were generated using the compiler 1112.

The computer 1102 also optionally comprises an external communication device such as a modem, satellite link, Ethernet card, or other device for accepting input from, and providing output to, other computers 1102.

In one embodiment, instructions implementing the operating system 1108, the computer program 1110, and the compiler 1112 are tangibly embodied in a non-transitory computer-readable medium, e.g., data storage device 1120, which could include one or more fixed or removable data storage devices, such as a zip drive, floppy disc drive 1124, hard drive, CD-ROM drive, tape drive, etc. Further, the operating system 1108 and the computer program 1110 are comprised of computer program 1110 instructions which, when accessed, read and executed by the computer 1102, cause the computer 1102 to perform the steps necessary to implement and/or use the present invention or to load the program of instructions into a memory 1106, thus creating a special purpose data structure causing the computer 1102 to operate as a specially programmed computer executing the method steps described herein. Computer program 1110 and/or operating instructions may also be tangibly embodied in memory 1106 and/or data communications devices 1130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1102.

Figure 12:
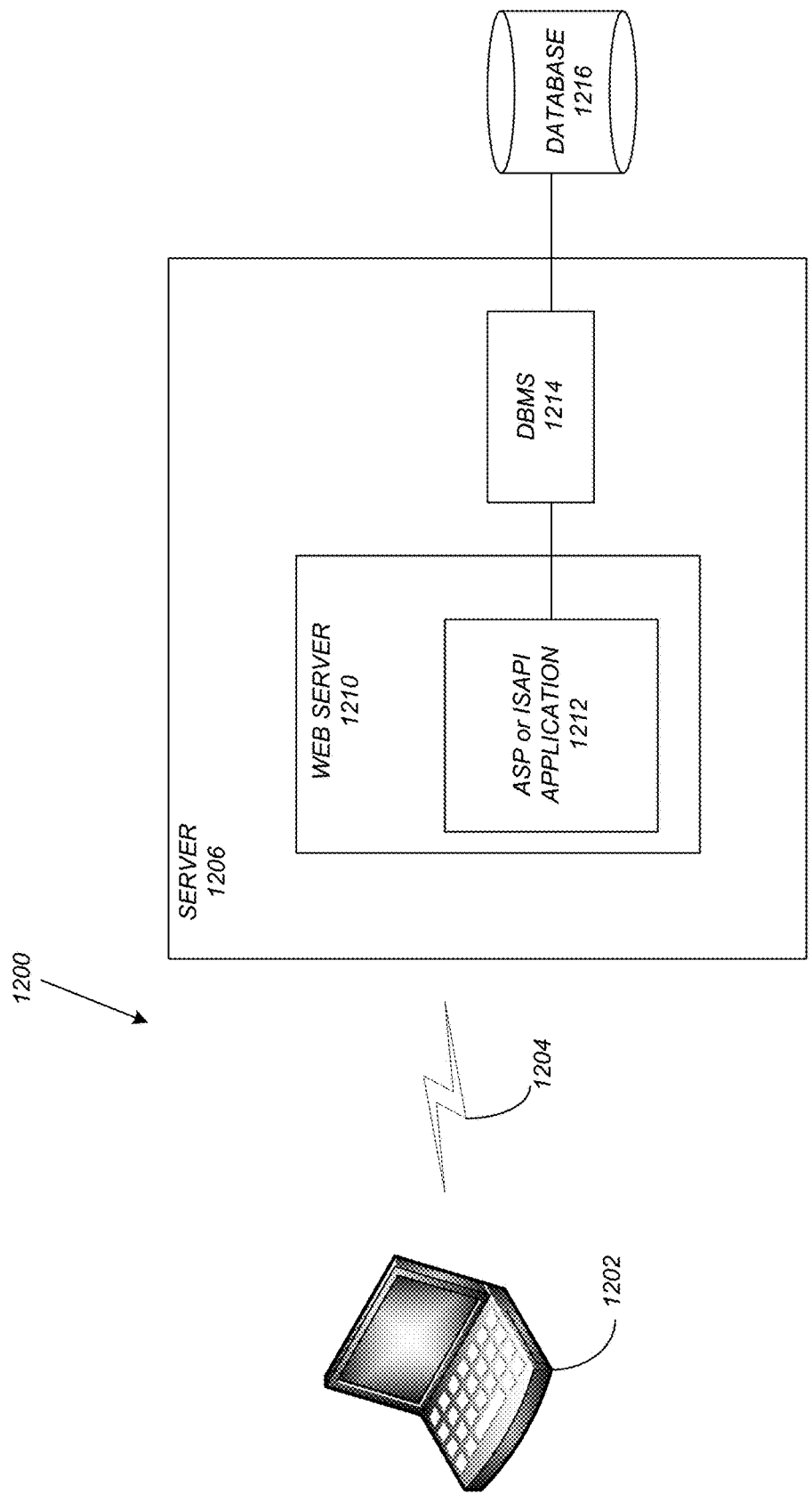
FIG. 12 schematically illustrates a typical distributed/cloud-based computer system using a network to connect client computers to server computers in accordance with one or more embodiments of the invention.

FIG. 12 schematically illustrates a typical distributed/cloud-based computer system 1200 using a network 1204 to connect client computers 1202 to server computers 1206. A typical combination of resources may include a network 1204 comprising the Internet, LANs (local area networks), WANs (wide area networks), SNA (systems network architecture) networks, or the like, clients 1202 that are personal computers or workstations (as set forth in FIG. 11), and servers 1206 that are personal computers, workstations, minicomputers, or mainframes (as set forth in FIG. 11). However, it may be noted that different networks such as a cellular network (e.g., GSM [global system for mobile communications] or otherwise), a satellite based network, or any other type of network may be used to connect clients 1202 and servers 1206 in accordance with embodiments of the invention.

A network 1204 such as the Internet connects clients 1202 to server computers 1206. Network 1204 may utilize ethernet, coaxial cable, wireless communications, radio frequency (RF), etc. to connect and provide the communication between clients 1202 and servers 1206. Further, in a cloud-based computing system, resources (e.g., storage, processors, applications, memory, infrastructure, etc.) in clients 1202 and server computers 1206 may be shared by clients 1202, server computers 1206, and users across one or more networks. Resources may be shared by multiple users and can be dynamically reallocated per demand. In this regard, cloud computing may be referred to as a model for enabling access to a shared pool of configurable computing resources.

Clients 1202 may execute a client application or web browser and communicate with server computers 1206 executing web servers 1210. Such a web browser is typically a program such as MICROSOFT INTERNET EXPLORER/ EDGE, MOZILLA FIREFOX, OPERA, APPLE SAFARI, GOOGLE CHROME, etc. Further, the software executing on clients 1202 may be downloaded from server computer 1206 to client computers 1202 and installed as a plug-in or ACTIVEX control of a web browser. Accordingly, clients 1202 may utilize ACTIVEX components/component object model (COM) or distributed COM (DCOM) components to provide a user interface on a display of client 1202. The web server 1210 is typically a program such as MICROSOFT'S INTERNET INFORMATION SERVER.

Web server 1210 may host an Active Server Page (ASP) or Internet Server Application Programming Interface (ISAPI) application 1212, which may be executing scripts. The scripts invoke objects that execute business logic (referred to as business objects). The business objects then manipulate data in database 1216 through a database management system (DBMS) 1214. Alternatively, database 1216 may be part of, or connected directly to, client 1202 instead of communicating/obtaining the information from database 1216 across network 1204. When a developer encapsulates the business functionality into objects, the system may be referred to as a component object model (COM) system. Accordingly, the scripts executing on web server 1210 (and/or application 1212) invoke COM objects that implement the business logic. Further, server 1206 may utilize MICROSOFT'S TRANSACTION SERVER (MTS) to access required data stored in database 1216 via an interface such as ADO (Active Data Objects), OLE DB (Object Linking and Embedding DataBase), or ODBC (Open DataBase Connectivity).

Generally, these components 1200-1216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/ or data, when read, executed, and/or interpreted, results in the steps necessary to implement and/or use the present invention being performed.

Although the terms "user computer", "client computer", and/or "server computer" are referred to herein, it is understood that such computers 1202 and 1206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1202 and 1206. Embodiments of the invention are implemented as a software/CAD application on a client 1202 or server computer 1206. Further, as described above, the client 1202 or server computer 1206 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Lee, Daniel D., and H. Sebastian Seung. "Algorithms for non-negative matrix factorization." Advances in neural information processing systems. 2001.

[2] Blei, David M., Andrew Y. Ng, and Michael I. Jordan. "Latent dirichlet allocation." Journal of machine Learning research 3. January (2003): 993-1022.

[3] Zou, Hui, and Trevor Hastie. "Regularization and variable selection via the elastic net." Journal of the royal statistical society: series B (statistical methodology) 67.2 (2005): 301-320.

[4] Friedman, Jerome H. "Greedy function approximation: a gradient boosting machine." Annals of statistics (2001): 1189-1232.

[5] LeCun, Yann, Yoshua Bengio, and Geoffrey Hinton. "Deep learning." Nature 521.7553 (2015): 436.

[6] Vanchinathan, Hastagiri P., et al. "Explore-exploit in top-n recommender systems via gaussian processes." Proceedings of the 8th ACM Conference on Recommender systems. ACM, 2014.

[9] Pang, Bo, and Lillian Lee. "Opinion mining and sentiment analysis." Foundations and Trends® in Information Retrieval 2.1-2 (2008): 1-135.

What is claimed is:

1. A computer-implemented method for personalizing a digital channel, comprising:
   (a) providing a digital channel to multiple users, wherein the digital channel comprises a website of a business;
   (b) collecting visitor information at each visit of each of the multiple users to the website, wherein:
      (1) the visitor information comprises data about each visit;
      (2) the visitor information comprises session data, user-item data, and outcome data, wherein:
         (i) the session data comprises contextual data about each visit;
         (ii) the user-item data comprises events associating each of the multiple users at each visit to the contextual data;
         (iii) the outcome data records events related to a business value of a session;
         (iv) the outcome data comprises binary data or numerical monetary value data; and
         (v) the events comprise actions by each of the multiple users that trigger a gain to the business;
      (3) each visit comprises multiple content items that are presented via the website, and wherein each of the multiple content items comprises text, an image, or a video of the business; and
(4) prior to each visit, no past knowledge of the multiple users is known;
(c) autonomously clustering the multiple users, wherein:
(1) the clustering segments a user population into two or more behavioral groups based on the visitor information;
(2) the clustering maximizes mutual information between the multiple users in an assigned behavioral group and one or more of the multiple content items; and
(3) the two or more behavioral groups are not set up manually;
(d) based on the clustering, generating and training a model for an interaction between each of the multiple users and each of the multiple content items, wherein:
(1) the model estimates a score for each interaction;
(2) the model is updated at a defined interval based on the visits of the multiple users to the website;
(3) the model comprises a machine learning model;
(e) determining, using the model and based on the score, which of the multiple content items to recommend to a specific user of the multiple users, wherein the determining jointly maximizes an outcome and a learning speed of the model; and
(f) personalizing and delivering the website for and to the specific user based on the recommended multiple content items, wherein the personalizing comprises components of the website rendering a variety of the multiple content items optimized for the specific user.

2. The computer-implemented method of claim 1, wherein the visitor information comprises:
the content item presented during each visit;
how the content item was assembled;
actions of each user during each visit; and
profile information of each user.

3. The computer-implemented method of claim 1, wherein the visitor information comprises:
a unique identifier of the content item provided to each user during each visit.

4. The computer-implemented method of claim 1, wherein the visitor information comprises:
an outcome of each visit, wherein the outcome comprises an action by one or more of the multiple users that triggers a gain to a business that is the subject of the digital channel.

5. The computer-implemented method of claim 1, wherein the visitor information comprises:
an outcome of each visit, wherein the outcome comprises an indirect action by one or more of the multiple users.

6. The computer-implemented method of claim 1, further comprising:
performing regression analysis that predicts an outcome as a function of the segment and contextual data.

7. The computer-implemented method of claim 1, further comprising:
using Baysian interference and an explore-exploit mechanism to determine how to personalize the digital channel for the specific user.

8. The computer-implemented method of claim 1, wherein the clustering comprises:
generating a user-item matrix (A) that sets, for each user (V) of the multiple users and each content item (C) of the multiple content items, a value monotonic to an aggregated outcome of all visits for each user (V);
decomposing the user-item matrix (A) into a matrix P and a matrix Q, wherein matrix P holds a decomposition of each user V into a set of K principal behaviors described by the matrix Q;
determining a measure $w_{vk}$ of how representative a principal behavior k is for each user v;
determining a measure $\varphi_{kc}$ of success of each content item c in each principal behavior k;
estimating an outcome for each content item C in each principal behavior K based on $w_{vk}$ and $\varphi_{kc}$; and
estimating the score based on the outcome.

9. The computer-implemented method of claim 1, wherein the clustering comprises:
maximizing the mutual information based on a determination of a set of weighted parameters, wherein:
the weights are determined using a Gradient descent method that determines local minimum by taking steps proportional to a negative of a gradient; and
the maximizing stops when a value of the mutual information does not accrue more than a pre-determined convergence threshold.

10. The computer-implemented method of claim 9, further comprising:
constraining the multiple users such that each of the multiple users can only belong to one of the two or more behavioral groups, wherein the score for each interaction is based on information in an associated behavioral group.

11. The computer-implemented method of claim 10, wherein:
the autonomously clustering is performed using a single thread serially for each user-contact item pair.

12. The computer-implemented method of claim 10, wherein:
the autonomously clustering is performed using multiple threads, wherein the mutual information is maximized by moving all of the multiple users between behavioral groups in parallel to determine which behavioral group maximizes the mutual information.

13. A computer-implemented system for personalizing a digital channel, comprising:
(a) a computer having a memory;
(b) a processor executing on the computer;
(c) the memory storing a set of instructions, wherein the set of instructions, when executed by the processor cause the processor to perform operations comprising:
(1) providing a digital channel to multiple users, wherein the digital channel comprises a website of a business;
(2) collecting visitor information at each visit of each of the multiple users to the website, wherein:
(i) the visitor information comprises data about each visit;
(ii) the visitor information comprises session data, user-item data, and outcome data, wherein:
(A) the session data comprises contextual data about each visit;
(B) the user-item data comprises events associating each of the multiple users at each visit to the contextual data;
(C) the outcome data records events related to a business value of a session;
(D) the outcome data comprises binary data or numerical monetary value data; and
(E) the events comprise actions by each of the multiple users that trigger a gain to the business;

(iii) each visit comprises multiple content items that are presented via the website, and wherein each of the multiple content items comprises text, an image, or a video of the business; and
(iv) prior to each visit, no past knowledge of the multiple users is known;
(3) autonomously clustering the multiple users, wherein:
(i) the clustering segments a user population into two or more behavioral groups based on the visitor information;
(ii) the clustering maximizes mutual information between the multiple users in an assigned behavioral group and one or more of the multiple content items; and
(iii) the two or more behavioral groups are not set up manually;
(4) based on the clustering, generating and training a model for an interaction between each of the multiple users and each of the multiple content items, wherein:
(i) the model estimates a score for each interaction;
(ii) the model is updated at a defined interval based on the visits of the multiple users to the website; and
(iii) the model comprises a machine learning model;
(5) determining, using the model and based on the score, which of the multiple content items to recommend to a specific user of the multiple users, wherein the determining jointly maximizes an outcome and a learning speed of the model; and
(6) personalizing and delivering the website for and to the specific user based on the recommended multiple content items, wherein the personalizing comprises components of the website rendering a variety of the multiple content items optimized for the specific user.

14. The computer-implemented system of claim 13, wherein the visitor information comprises:
the content item presented during each visit;
how the content item was assembled;
actions of each user during each visit; and
profile information of each user.

15. The computer-implemented system of claim 13, wherein the visitor information comprises:
a unique identifier of the content item provided to each user during each visit.

16. The computer-implemented system of claim 13, wherein the visitor information comprises:
an outcome of each visit, wherein the outcome comprises an action by one or more of the multiple user that triggers a gain to a business that is the subject of the digital channel.

17. The computer-implemented system of claim 13, wherein the visitor information comprises:
an outcome of each visit, wherein the outcome comprises an indirect action by one or more of the multiple users.

18. The computer-implemented system of claim 13, wherein the operations further comprise:
performing regression analysis that predicts an outcome as a function of the segment and contextual data.

19. The computer-implemented system of claim 13, wherein the operations further comprise:
using Baysian interference and an explore-exploit mechanism to determine how to personalize the digital channel for the specific user.

20. The computer-implemented system of claim 13, wherein the clustering comprises:
generating a user-item matrix (A) that sets, for each user (V) of the multiple users and each content item (C) of the multiple content items, a value monotonic to an aggregated outcome of all visits for each user (V);
decomposing the user-item matrix (A) into a matrix P and a matrix Q, wherein matrix P holds a decomposition of each user V into a set of K principal behaviors described by the matrix Q;
determining a measure $w_{vk}$ of how representative a principal behavior k is for each user v;
determining a measure $\varphi_{kc}$ of success of each content item c in each principal behavior k;
estimating an outcome for each content item C in each principal behavior K based on $w_{vk}$ and $\varphi_{kc}$; and
estimating the score based on the outcome.

21. The computer-implemented system of claim 13, wherein the clustering comprises:
maximizing the mutual information based on a determination of a set of weighted parameters, wherein:
the weights are determined using a Gradient descent method that determines local minimum by taking steps proportional to a negative of a gradient; and
the maximizing stops when a value of the mutual information does not accrue more than a pre-determined convergence threshold.

22. The computer-implemented system of claim 21, wherein the operations further comprise:
constraining the multiple users such that each of the multiple users can only belong to one of the two or more behavioral groups, wherein the score for each interaction is based on information in an associated behavioral group.

23. The computer-implemented system of claim 22, wherein:
the autonomously clustering is performed using a single thread serially for each user-contact item pair.

24. The computer-implemented system of claim 22, wherein:
the autonomously clustering is performed using multiple threads, wherein the mutual information is maximized by moving all of the multiple users between behavioral groups in parallel to determine which behavioral group maximizes the mutual information.

* * * * *